US 11,971,969 B2

(12) United States Patent
Chae

(10) Patent No.: US 11,971,969 B2
(45) Date of Patent: Apr. 30, 2024

(54) AUTHENTICATION SYSTEM, AUTHENTICATION METHOD AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 173 days.

(21) Appl. No.: 17/419,296

(22) PCT Filed: Sep. 17, 2020

(86) PCT No.: PCT/JP2020/035287
§ 371 (c)(1),
(2) Date: Jun. 29, 2021

(87) PCT Pub. No.: WO2022/059140
PCT Pub. Date: Mar. 24, 2022

(65) Prior Publication Data
US 2022/0309140 A1    Sep. 29, 2022

(51) Int. Cl.
G06F 21/00    (2013.01)
G06F 21/31    (2013.01)
G06F 21/32    (2013.01)
G06F 21/35    (2013.01)
G06F 21/36    (2013.01)
H04L 9/32    (2006.01)

(52) U.S. Cl.
CPC ............ G06F 21/32 (2013.01); G06F 21/316 (2013.01); G06F 21/35 (2013.01); G06F 21/36 (2013.01); H04L 9/32 (2013.01); H04L 9/3231 (2013.01); G06F 2221/2111 (2013.01)

(58) Field of Classification Search
None
See application file for complete search history.

(56) References Cited

FOREIGN PATENT DOCUMENTS

| JP | 2010152842 A | * | 7/2010 |
| JP | 2010152842 A | | 7/2010 |
| JP | 6690074 B1 | * | 4/2020 |
| JP | 6690074 B1 | | 4/2020 |

OTHER PUBLICATIONS

International Search Report for PCT/JP2020/035287 (See transmittal letter).

* cited by examiner

Primary Examiner — Andrew J Steinle
(74) Attorney, Agent, or Firm — HEA LAW PLLC

(57) ABSTRACT

An authentication system includes at least one processor configured to register user information on a user who is to visit a predetermined location, and scheduled time information on scheduled time at which the user is to visit the predetermined location, in association with each other in a storage, execute, when someone visits the predetermined location, authentication based on visitor information on the someone, the user information, visit time information on time at which the someone visits the predetermined location, and the scheduled time information.

11 Claims, 15 Drawing Sheets

FIG.7

| STORE ID | STORE NAME | PASSWORD | GENRE | AREA | ADDRESS | PHONE NUMBER | EMAIL ADDRESS | STORE IMAGE | CAPACITY INFORMATION |
|---|---|---|---|---|---|---|---|---|---|
| s00001 | AAA CAFE | ******** | ITALIAN/CAFE | TOKYO | ...SHIBUYA-KU, TOKYO | 03-AAAA-BBBB | aaa-cafe@aaa.com | aaa.jpg | PICKUP BOX: 1, STAFF: 3 |
| s00002 | BBB RESTAURANT | ******* | FRENCH | TOKYO | ...SHINJUKU-KU, TOKYO | 03-CCCC-DDDD | bbb@bbb.jp | bbb.jpg | PICKUP BOX: 3, STAFF: 5 |
| s00003 | CCC BAKERY | ********* | BREAD | TOKYO | ...MINATO-KU, TOKYO | 03-EEEE-FFFF | ccc@ccc.com | ccc.jpg | PICKUP BOX: 2, STAFF: 2 |
| ... | ... | ... | ... | ... | ... | ... | ... | ... | ... |

| USER ID | NAME | PASSWORD | AGE | SEX | ADDRESS | PHONE NUMBER | EMAIL ADDRESS | PORTRAIT | FEATURE AMOUNT | MEANS OF TRAVEL | PAYMENT INFORMATION |
|---|---|---|---|---|---|---|---|---|---|---|---|
| u00001 | TARO YAMADA | ****** | 30 | MALE | ... SHIBUYA-KU, TOKYO | 090-XXXX-YYYY | taro.yamada@abcde.com | aaa.jpg | (a1,b1,c1・・・) | ON FOOT | CARD NUMBER A |
| u00002 | HANAKO SUZUKI | ****** | 25 | FEMALE | ... SETAGAYA-KU, TOKYO | 090-ZZZZ-AAAA | hanako.suzuki@fghijk.jp | xxx.jpg | (a2,b2,c2・・・) | BY TRAIN | ELECTRONIC MONEY B |
| u00003 | JIRO KATAYAMA | ****** | 40 | MALE | ... ITABASHI-KU, TOKYO | 080-KKKK-LLLL | jiro.katayama@lmnopq.com | yyy.jpg | (a3,b3,c3・・・) | BY CAR | DEBIT CARD C |
| ... | ... | ... | ... | ... | ... | ... | ... | ... | ... | ... | ... |

| ORDER ID | STORE ID | ORDERER INFORMATION | ORDER CONTENT INFORMATION | SCHEDULED TIME INFORMATION | RECEIVER INFORMATION |
|---|---|---|---|---|---|
| o00001 | s00001 | u00001,TARO YAMADA... | HAM SANDWICH 1,... | 2020/9/10 18:00-18:30 | u00001,TARO YAMADA... |
| o00002 | s00025 | u00007,MIKI TANAKA... | FRIED RICE 2,... | 2020/9/10 17:30-17:45 | u00007,AKIKO KOIZUMI... |
| o00003 | s00004 | u00023,SABURO ITO... | COFFEE 1,... | 2020/9/15 AROUND 19:00 | u00023,SABURO ITO... |
| ... | ... | ... | ... | ... | ... |

| STORE ID | ITEM ID | ITEM NAME | PRICE | ITEM IMAGE | PREPARATION TIME INFORMATION |
|---|---|---|---|---|---|
| s00001 | i00001 | HAM SANDWICH | 500 | s00001_i00001.jpg | 3 MIN. |
| s00001 | i00002 | KATSU SANDWICH | 800 | s00001_i00002.jpg | 10 MIN. |
| s00001 | i00003 | STEAK SANDWICH | 900 | s00001_i00003.jpg | 8 MIN. |
| ... | ... | ... | ... | ... | ... |

AUTHENTICATION SYSTEM, AUTHENTICATION METHOD AND PROGRAM

CROSS REFERENCE TO RELATED APPLICATIONS

This application is a National Stage of International Application No. PCT/JP2020/035287 filed on Sep. 17, 2020. The contents of the above document is incorporated herein by reference in its entirety.

TECHNICAL FIELD

The present disclosure relates to an authentication system, an authentication method, and a program.

BACKGROUND ART

Hitherto, there is known a technology of verifying, when a user is scheduled to visit a predetermined location, whether a person who actually visits the predetermined location is an authentic user. In Patent Literature 1, for example, there is described a system configured to issue in advance an IC card having recorded therein biometric information of a user (for example, orderer of items or representative) who is to pick up items stored in a locker, cause the locker to read the IC card to execute biometric authentication, and permit the items stored in the locker to be picked up when the biometric authentication is successful.

CITATION LIST

Patent Literature

[PTL 1] JP 2010-152842 A

SUMMARY OF INVENTION

Technical Problem

However, with the technology of Patent Literature 1, the user is required to carry the IC card to pick up the items stored in the locker, and hence there is a fear that the IC card may be stolen or lost. For example, when an outsider who has gained the IC card gains in some way a portrait and other information of the user, the outsider can impersonate the user to pick up the items, and hence security cannot be improved sufficiently.

It is an object of the present disclosure to improve security in a case of authenticating a person who has visited a predetermined location.

Solution to Problem

According to one embodiment of the present disclosure, there is provided an authentication system including: registration means for registering user information on a user who is to visit a predetermined location, and scheduled time information on scheduled time at which the user is to visit the predetermined location, in association with each other in storage means; and authentication means for executing, when someone visits the predetermined location, authentication based on visitor information on the someone, the user information, visit time information on time at which the someone visits the predetermined location, and the scheduled time information.

According to one embodiment of the present disclosure, there is provided an authentication method including: a registration step of registering user information on a user who is to visit a predetermined location, and scheduled time information on scheduled time at which the user is to visit the predetermined location, in association with each other in storage means; and an authentication step of executing, when someone visits the predetermined location, authentication based on visitor information on the someone, the user information, visit time information on time at which the someone visits the predetermined location, and the scheduled time information.

According to one embodiment of the present disclosure, there is provided a program for causing a computer to function as: registration means for registering user information on a user who is to visit a predetermined location, and scheduled time information on scheduled time at which the user is to visit the predetermined location, in association with each other in storage means; and authentication means for executing, when someone visits the predetermined location, authentication based on visitor information on the someone, the user information, visit time information on time at which the someone visits the predetermined location, and the scheduled time information.

According to one aspect of the present disclosure, the registration means is configured to register the user information on each of a plurality of users who are to visit the predetermined location, and the scheduled time information on scheduled times at which the plurality of users are to visit the predetermined location, in association with each other in the storage means, and the authentication means is configured to execute the authentication based on the visitor information and, of the user information on each of the plurality of users, the user information with which the scheduled time information corresponding to the visit time information is associated.

According to one aspect of the present disclosure, the registration means is configured to register, in association with each of a plurality of the predetermined locations, the user information on a user who is to visit the predetermined location, and the scheduled time information on scheduled time at which the user is to visit the predetermined location, in the storage means, and the authentication means is configured to execute, when the someone visits anyone of the plurality of predetermined locations, the authentication based on the visitor information on the someone, the user information associated with the predetermined location, the visit time information on time at which the someone visits the predetermined location, and the scheduled time information associated with the predetermined location.

According to one aspect of the present disclosure, the authentication system further includes: presentation means for presenting, to the user or a requester who requests the user to travel, options on time at which the user is to visit the predetermined location; and acquisition means for acquiring the scheduled time information based on one of the options that is selected by the user or the requester, and the registration means is configured to register the scheduled time information acquired by the acquisition means in the storage means.

According to one aspect of the present disclosure, the presentation means is configured to present the options to the user or the requester based on preparation time information on time required for preparation in the predetermined location.

According to one aspect of the present disclosure, the presentation means is configured to present the options to the user or the requester based on capacity information on a capacity in the predetermined location.

According to one aspect of the present disclosure, the presentation means is configured to present the options to the user or the requester based on travel time information on time required to travel to the predetermined location.

According to one aspect of the present disclosure, the presentation means is configured to acquire the travel time information based on, of a plurality of means of travel, means of travel specified by the user or the requester.

According to one aspect of the present disclosure, the registration means is configured to register, before registering the user information of the user and the scheduled time information in the storage means, user information on another user who is to visit the predetermined location, and scheduled time information on scheduled time at which the another user is to visit the predetermined location, in association with each other in the storage means, the authentication system further includes determination means for determining whether a fear of erroneous authentication exists between the user and the another user, and the presentation means is configured to present the options to the user or the requester based on a result of the determination by the determination means.

According to one aspect of the present disclosure, the presentation means is configured to present, to the user or the requester, a plurality of the options including the options based on conditions specified by the user or the requester, and the options based on conditions obtained by changing a part of the conditions.

According to one aspect of the present disclosure, the registration means is configured to register, before registering the user information of the user and the scheduled time information in the storage means, user information on another user who is to visit the predetermined location, and scheduled time information on scheduled time at which the another user is to visit the predetermined location, in association with each other in the storage means, and the authentication system further includes: determination means for determining whether a fear of erroneous authentication exists between the user and the another user; and additional authentication means for requesting additional authentication of the someone based on a result of the determination by the determination means.

According to one aspect of the present disclosure, the registration means is configured to register biometric information of the user, or identification information of the user for acquiring the biometric information, as the user information in the storage means, the visitor information is biometric information of the someone, and the authentication means is configured to execute the authentication based on the biometric information of the someone, the biometric information of the user, the visit time information, and the scheduled time information.

According to one aspect of the present disclosure, the predetermined location is a store at which the user is to pick up an item, the scheduled time information is information on scheduled time at which the user is to visit the store, the visit time information is information on time at which the someone visits the store, and the authentication system further includes permission means for permitting the pickup of the item at the store when the authentication is successful.

Advantageous Effects of Invention

According to the present disclosure, it is possible to improve security in the case of authenticating the person who has visited the predetermined location.

BRIEF DESCRIPTION OF DRAWINGS

FIG. 7 is a table for showing a data storage example of a store database.

FIG. 8 is a table for showing a data storage example of a user database.

FIG. 9 is a table for showing a data storage example of an order database.

FIG. 10 is a table for showing a data storage example of an item database.

DESCRIPTION OF EMBODIMENTS

1. Overall Configuration of Authentication System

Now, an example of an authentication system according to an embodiment of the present disclosure is described. In this embodiment, description is given taking as an example a case in which the authentication system is applied to a service of accepting an order of items, but the authentication system is applicable to various services. Examples of application to other services are described later in modification examples.

Figure 1:
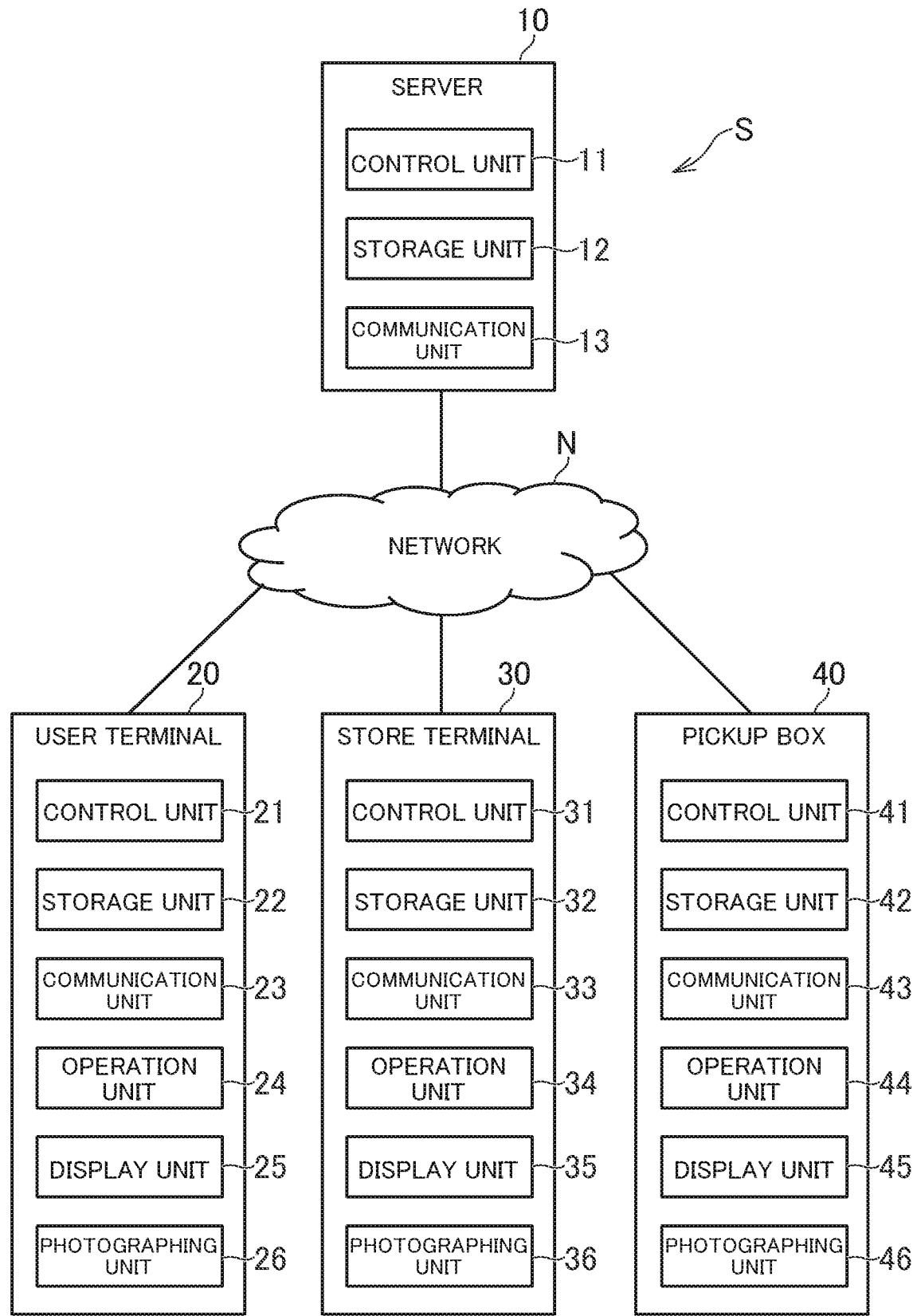
FIG. 1 is a diagram for illustrating an example of an overall configuration of an authentication system.

FIG. 1 is a diagram for illustrating an example of an overall configuration of the authentication system. As illustrated in FIG. 1, an authentication system S includes a server 10, a user terminal 20, a store terminal 30, and a pickup box 40. Each of the server 10, the user terminal 20, the store terminal 30, and the pickup box 40 is connectable to a network N, for example, the Internet. Each of the server 10, the user terminal 20, the store terminal 30, and the pickup box 40 may be provided in plurality.

The server 10 is a server computer. The server 10 includes a control unit 11, a storage unit 12, and a communication unit 13. The control unit 11 includes at least one microprocessor. The control unit 11 executes processing as programmed by programs and data stored in the storage unit 12. The storage unit 12 includes a main memory unit and an auxiliary memory unit. For example, the main memory unit is a volatile memory, for example, a RAM. Further, for example, the auxiliary memory unit is a non-volatile memory such as a ROM, an EEPROM, a flash memory, or a hard disk drive. The communication unit 13 is a communication interface for wired communication or wireless communication.

The user terminal 20 is a computer to be operated by a user. For example, the user terminal 20 is a mobile phone (including a smart phone), a personal digital assistant (including a tablet-type computer and a wearable device), a personal computer, or the like. In this embodiment, the user terminal 20 includes a control unit 21, a storage unit 22, a communication unit 23, an operation unit 24, a display unit 25, and a photographing unit 26. Physical components of the control unit 21, the storage unit 22, and the communication unit 23 may be similar to those of the control unit 11, the storage unit 12, and the communication unit 13, respectively.

The operation unit 24 is an input device. For example, the operation unit 24 includes a touch panel, a mouse, a keyboard, or buttons. For example, the display unit 25 is a liquid crystal display unit or an organic EL display unit. The photographing unit 26 includes at least one camera. For example, the photographing unit 26 includes an image pickup element such as a CCD image sensor or a CMOS image sensor. The photographing unit 26 is configured to record, as digital data, an image taken by the imaging element. The image may be a still image or a moving image taken consecutively at a predetermined frame rate.

The store terminal 30 is a computer to be operated by store staff. For example, the store terminal 30 is a mobile phone, a personal digital assistant, a personal computer, or the like. In this embodiment, the store terminal 30 includes a control unit 31, a storage unit 32, a communication unit 33, an operation unit 34, a display unit 35, and a photographing unit 36. Physical components of the control unit 31, the storage unit 32, the communication unit 33, the operation unit 34, the display unit 35, and the photographing unit 36 may be similar to those of the control unit 11, the storage unit 12, the communication unit 13, the operation unit 24, the display unit 25, and the photographing unit 26, respectively.

The pickup box 40 is a box configured to store items. For example, the pickup box 40 has a configuration equivalent to that of a smart phone or a tablet terminal, and includes a control unit 41, a storage unit 42, a communication unit 43, an operation unit 44, a display unit 45, and a photographing unit 46. Physical components of the control unit 41, the storage unit 42, the communication unit 43, the operation unit 44, the display unit 45, and the photographing unit 46 may be similar to those of the control unit 11, the storage unit 12, the communication unit 13, the operation unit 24, the display unit 25, and the photographing unit 26, respectively. Alternatively, the pickup box 40 may have a simple configuration as in the modification examples to be described later.

Programs and data described to be stored in the storage units 12, 22, 32, and 42 may be supplied through the network N. Further, hardware components of each of the server 10, the user terminal 20, the store terminal 30, and the pickup box 40 are not limited to the above-mentioned examples, and various kinds of hardware are applicable. For example, a reading unit (for example, an optical disc drive or a memory card slot) configured to read a computer-readable information storage medium, or an input/output unit (for example, a USB port) configured to input/output data to/from an external device may be included. For example, programs or data stored in an information storage medium may be supplied via the reading unit or the input/output unit.

2. Overview of Authentication System

In this embodiment, processing of the authentication system S is described taking as an example a case in which the user operates the user terminal 20 to order items of a store, and the user himself or herself visits the store empty-handed to pick up the items. The store is an example of a predetermined location that the user is to visit. For that reason, description of "store" in this embodiment can be read as "predetermined location." The term "visiting" has similar meaning to coming, going, or traveling.

Further, in this embodiment, an eating and drinking establishment is described as an example of the store, and food and drink are described as an example of the items. In regard to the authentication system S, the authentication system S is applicable to a service of ordering items of a certain store. Examples of application to other types of stores are described later in the modification examples. Further, the predetermined location that the user is to visit may be a certain location as well as a store. Examples of application to other locations are also described later in the modification examples.

Figure 2:
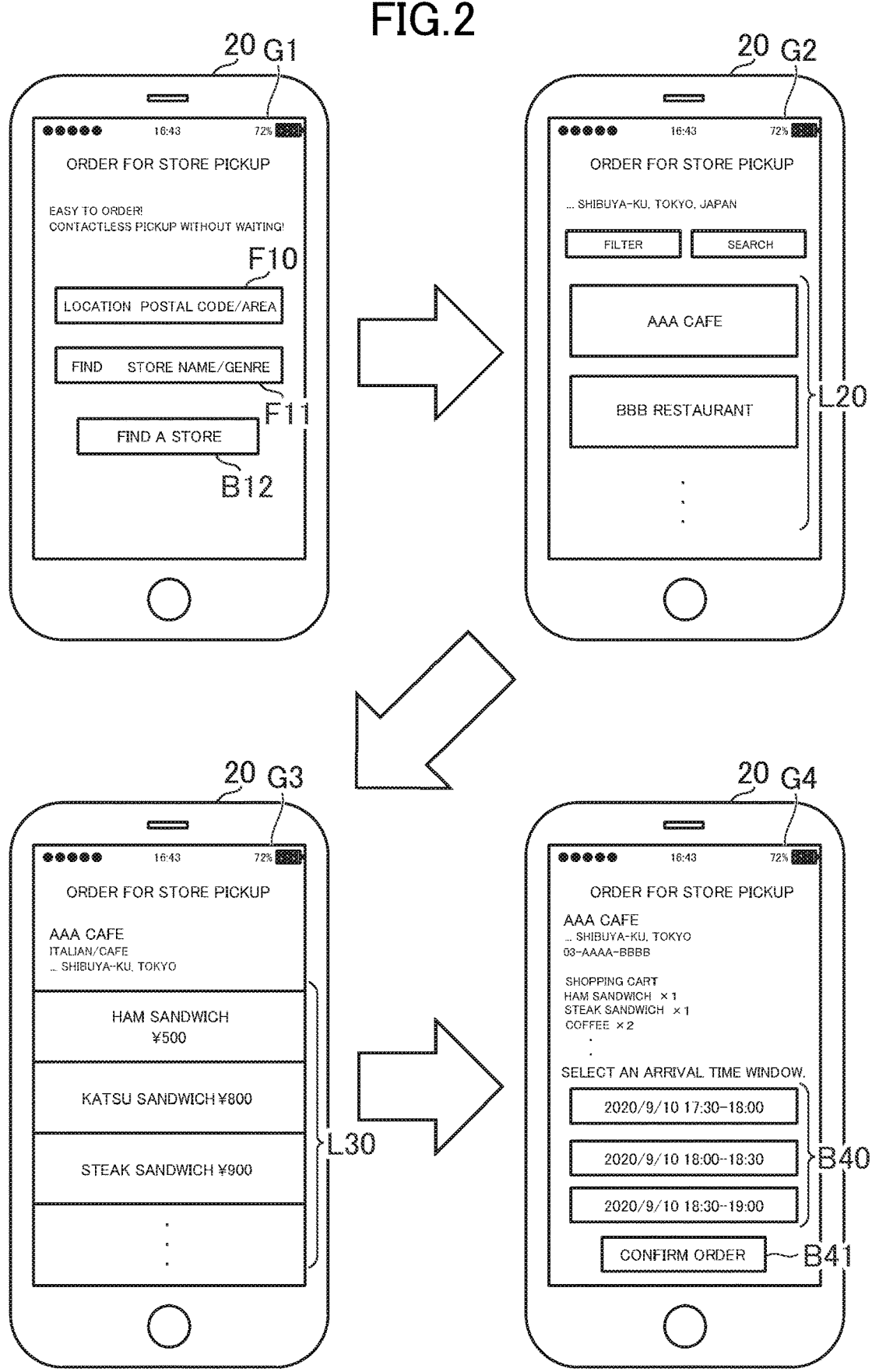
FIG. 2 is a view for illustrating an example of a flow in which a user orders items.

FIG. 2 is a view for illustrating an example of a flow in which a user orders items. As illustrated in FIG. 2, when the user starts an application for accepting an order of items, which is installed in the user terminal 20, a menu screen G1 is displayed on the display unit 25. In this embodiment, description is given of a case in which each of screens shown in FIG. 2 is displayed as a screen of the application, but each of the screens may be displayed as a screen of a browser.

The menu screen G1 displays input forms F10 and F11 for inputting search conditions, and a button B12 for executing a search. The search conditions are conditions for searching for at least one of a store and an item. The search conditions may be any conditions, and include at least one of a postal code, an area, a store name, and a genre, for example. When the user inputs the search conditions in the input forms F10 and F11 and selects the button B12, a search result screen G2 showing search results is displayed on the display unit 25.

The search result screen G2 displays a list L20 of stores found in the search based on the search conditions input by the user. The list L20 displays at least one store in a selectable manner. When the user selects any one of the stores in the list L20, a details screen G3 showing details of the store is displayed on the display unit 25.

The details screen G3 displays a list L30 of items of the store selected by the user. The list L30 displays at least one item in a selectable manner. The user selects certain items in the list L30 and puts the selected items in the shopping cart. The user causes each of the menu screen G1, the search result screen G2, and the details screen G3 to be displayed until he or she finds desired items, and puts the desired items in the shopping cart. When the user puts the desired items in the shopping cart and performs operation for confirming the order content, a confirmation screen G4 is displayed on the display unit 25.

The confirmation screen G4 displays a store name, an address, a phone number, and other information on the store, and an item name, quantities, a price, and other information on each of the items in the shopping cart. The confirmation screen G4 displays, along with those pieces of information, buttons B40 for selecting an arrival time window, and a button B41 for confirming the order. Although details are to be described later, in this embodiment, possible arrival time windows are calculated in consideration of various factors, such as cooking time for the items, a staff capacity, a capacity of the pickup box 40, and travel time of the user.

When the user selects any one of the buttons B40 and then selects the button B41, the server 10 accepts the order of the user, and executes payment processing with the use of a credit card number registered in advance or the like. When the payment processing is complete, the server 10 transmits a notification indicating the order content of the user to the store terminal 30. When receiving the notification, the store terminal 30 displays an order content screen showing the order content of the user on the display unit 35.

Figure 3:
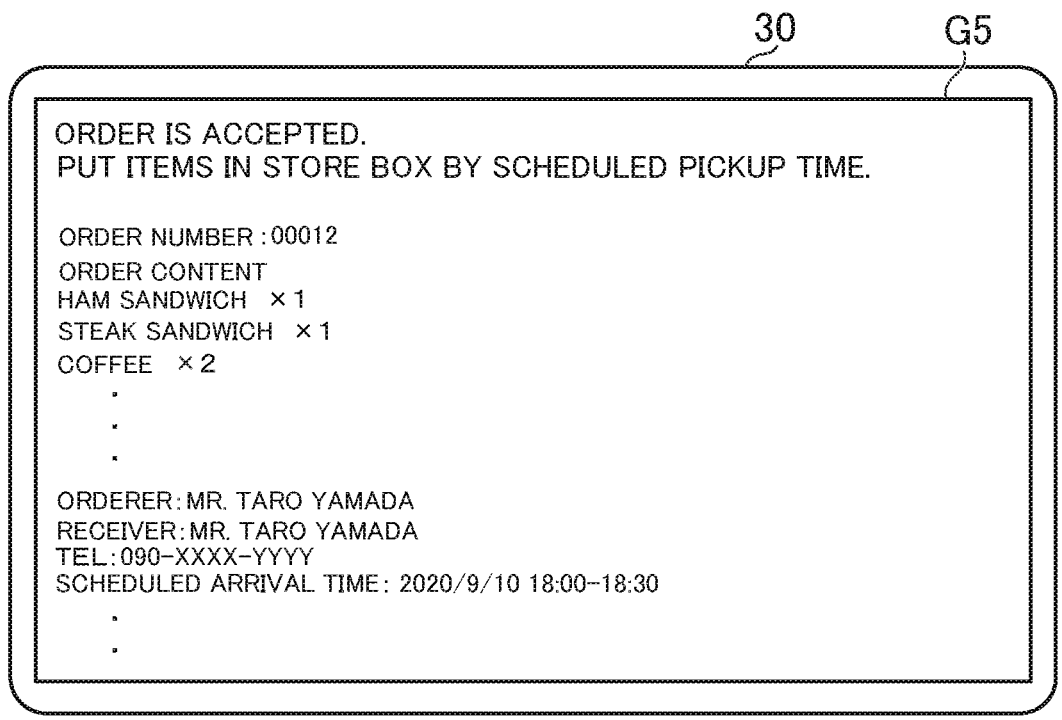
FIG. 3 is a view for illustrating an example of an order content screen displayed on a store terminal.

FIG. 3 is a view for illustrating an example of the order content screen displayed on the store terminal 30. As illustrated in FIG. 3, an order content screen G5 displays item names and other information of ordered items, a name and other information of the user, and a scheduled arrival time window. In this embodiment, description is given of a case in which the order content screen G5 is displayed as a screen of an application installed in the store terminal 30, but may be displayed as a screen of a browser. Alternatively, contents similar to those of the order content screen G5 may be displayed through use of an electronic mail, an SNS, or the like.

When staff sees the order content screen G5, the staff starts cooking the items so as to be in time for the scheduled arrival time window. The staff completes cooking and wrapping the items before the scheduled arrival time window, and stores the items in the pickup box 40. The user travels from a departure point, for example, his or her home, to the store so as to be in time for the scheduled arrival time window, and picks up the items in the pickup box 40.

Figure 4:
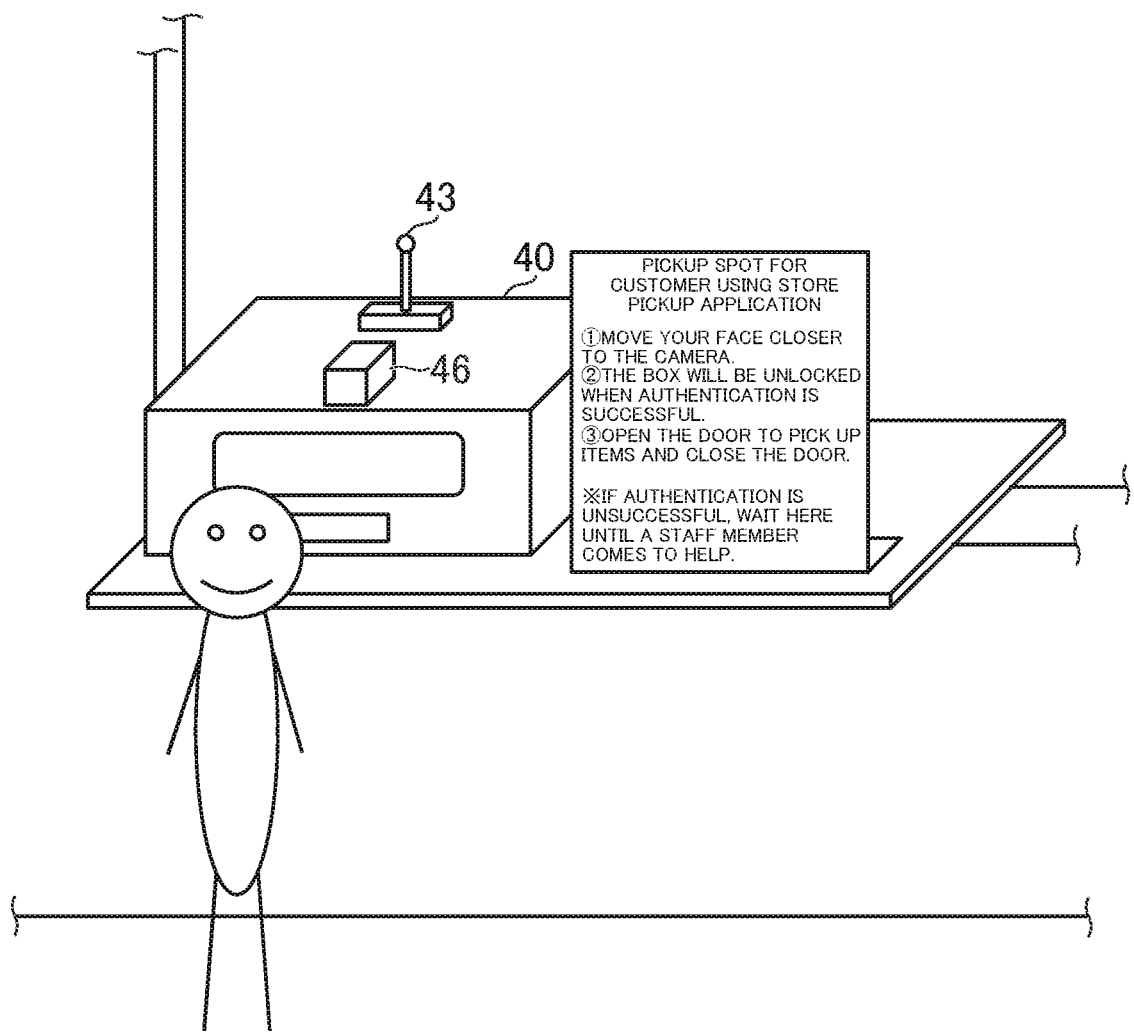
FIG. 4 is a view for illustrating an example of how the user picks up items in a pickup box.

FIG. 4 is a view for illustrating an example of how the user picks up the items in the pickup box 40. As illustrated in FIG. 4, the pickup box 40 is arranged inside or outside of the store. In FIG. 4, of the components of the pickup box 40 illustrated in FIG. 1, only the communication unit 43 and the photographing unit 46 are illustrated, but the operation unit 44 and the display unit 45 may also be arranged on the user side. In this case, an item pickup procedure may be displayed on the display unit 45, and the user may perform operation for picking up the items on the operation unit 44.

The pickup box 40 in this embodiment includes spaces in which items ordered by a plurality of users can be stored, respectively. For example, the pickup box 40 is divided into three spaces, and can store orders for three users. The spaces in the pickup box 40 are not limited to the example in this embodiment, and may include a space or spaces in which an order or orders of one user, two users, or four or more users can be stored. Alternatively, a plurality of pickup boxes 40 may be arranged in the store.

The staff is to attach, to wrapped items, memos describing information for identifying to which user the items belong. Those pieces of information may be imparted to the items by any other method, for example, directly writing on a wrapping bag. By looking at those pieces of information, the user can identify the items he or she is supposed to pick up even when items for a plurality of orders are stored in the pickup box 40.

For example, the pickup box 40 has doors on the front side and the back side, respectively, as seen from the user. The door on the front side is used for the user to pick up the items. The door on the back side is locked in principle. When the user who has arrived is successfully authenticated, the door on the front side of the pickup box 40 is unlocked. In this embodiment, face authentication is described as an example of the authentication, but various known methods are applicable to the authentication itself. Application examples of other authentication are described later in the modification examples. The door on the back side is used for the staff to store the items.

When the user has arrived in a time window specified by himself or herself, the user causes the photographing unit 46 of the pickup box 40 to photograph his or her face. The pickup box 40 transmits, to the server 10, a taken image obtained as a result of the photographing by the photographing unit 46. The server 10 executes the face authentication based on a feature amount of a face shown in the taken image received from the pickup box 40, and a feature amount of a face extracted from a portrait registered in advance by the user.

When the face authentication is successful, the door on the front side of the pickup box 40 is unlocked. When the door on the front side is unlocked, the user opens the door to pick up the items. After picking up the items, the user closes the door on the front side. This completes the pickup of the items at the store. The door on the front side may be opened and closed automatically under control of the pickup box 40. When the face authentication has failed, a notification screen for notifying the staff of the failure is displayed on the display unit 35 of the store terminal 30.

Figure 5:
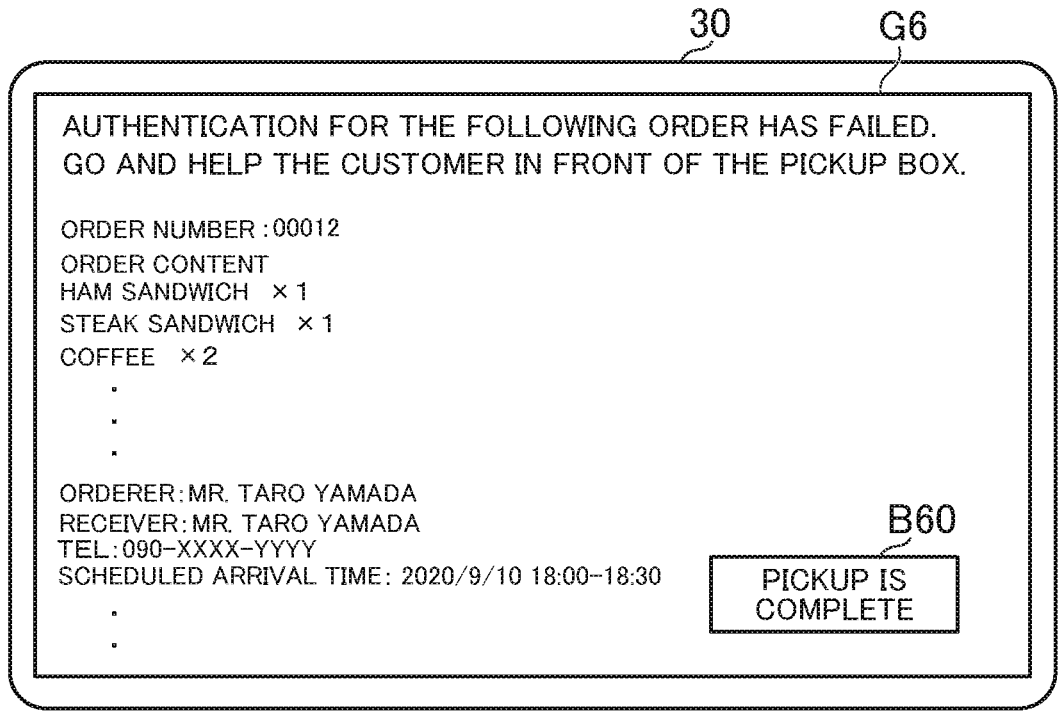
FIG. 5 is a view for illustrating an example of a notification screen displayed on the store terminal.

FIG. 5 is a view for illustrating an example of the notification screen displayed on the store terminal 30. As illustrated in FIG. 5, a notification screen G6 displays a message that the face authentication has failed to prompt the staff to help the user as instructed in a manual. When the staff sees the notification screen G6, the staff attends the user in front of the pickup box 40. After verbally confirming validity of the user based on the information displayed on the notification screen G6, the staff hands the items in the pickup box 40 to the user. The staff may request the user to present his or her identification card. Thereafter, when the staff selects a button B60, the server 10 is notified that the pickup of the items is complete.

As described above, in this embodiment, even when the user arrives at the store empty-handed, as long as the face authentication is successful, the user can pick up the items without directly contacting the staff. It should be noted, however, that because the face authentication is not completely accurate, when simple face authentication is used alone, there is a fear that a malicious outsider may impersonate the user to pick up the items. This risk is not limited to the face authentication, and is also true for other authentication.

To address the above-mentioned problem, in this embodiment, it is ensured that even with an authentic user, the face authentication ends up unsuccessfully unless the user arrives at the store in the time window specified by himself or herself. Consequently, even when an outsider who resembles the user in face comes to the store, the outsider cannot pick up the items without permission unless he or she knows the time window specified by the user. In this manner, the authentication system S is configured to improve security by using not only simple face authentication but also temporal information that is unknown to the outsider. Details of this technology are described below.

3. Functions Achieved in Authentication System

Figure 6:
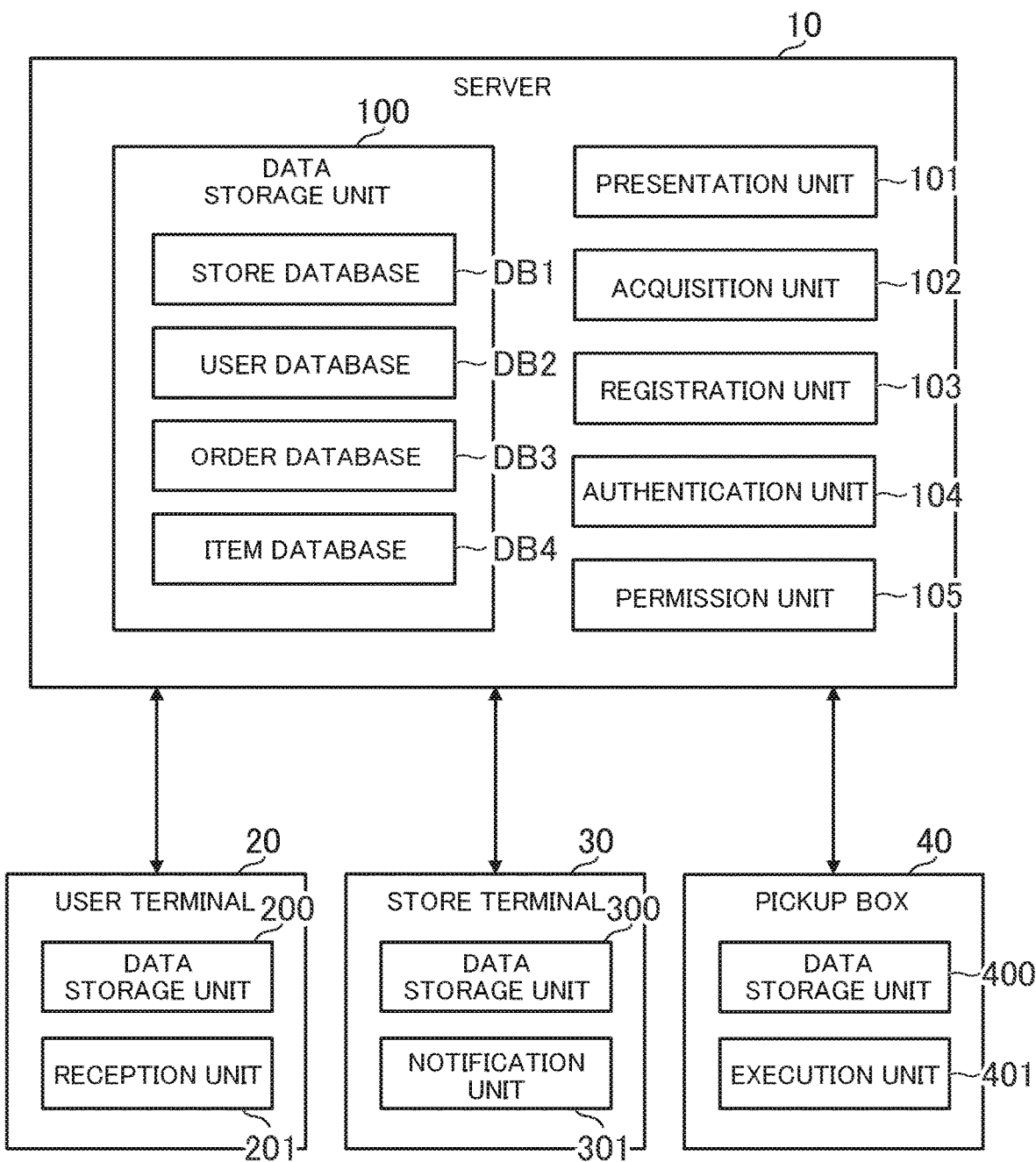
FIG. 6 is a functional block diagram for illustrating an example of functions achieved in the authentication system.

FIG. 6 is a functional block diagram for illustrating an example of functions achieved in the authentication system S. Now, description is given of functions achieved by each of the server 10, the user terminal 20, the store terminal 30, and the pickup box 40.

[3-1. Functions Achieved in Server]

As illustrated in FIG. 6, a data storage unit 100, a presentation unit 101, an acquisition unit 102, a registration unit 103, an authentication unit 104, and a permission unit 105 are achieved in the server 10. The data storage unit 100 is mainly achieved by the storage unit 12. Each of the presentation unit 101, the acquisition unit 102, the registration unit 103, the authentication unit 104, and the permission unit 105 is mainly achieved by the control unit 11.

[Data Storage Unit]

The data storage unit 100 is configured to store data required for authentication. Here, as an example of the data stored in the data storage unit 100, a store database DB1, a user database DB2, an order database DB3, and an item database DB4 are described.

FIG. 7 is a table for showing a data storage example of the store database DB1. As shown in FIG. 7, the store database DB1 is a database storing information on each of a plurality of stores. For example, the store database DB1 stores a store ID, a store name, a password, a genre, an area, an address, a phone number, an email address, a store image, and capacity information. The store database DB1 can be updated by the staff.

The store ID is information for uniquely identifying the store. The password is used to log in from the application installed in the store terminal 30. The store name, the genre, the area, and the address are used as indices in a search. The store database DB1 includes other information such as a description and reviews of the store, and the other information may be used as the indices.

The capacity information is information on a capacity of the store. The term "capacity" means processing ability in the store. In this embodiment, description is given of a case in which the capacity is expressed by a numerical value, but the capacity may be expressed by another element, for example, a character. As the numerical value becomes higher, the capacity becomes larger. As the capacity becomes larger, time required from when the order is accepted to when the preparation is complete becomes shorter.

In a case of a capacity in terms of facilities, for example, the capacity information may indicate at least one of the number and sizes of pickup boxes 40, and the number of items that can be stored therein, or may indicate at least one of the number and types of cooking facilities of the store, and the size of a kitchen thereof. Meanwhile, in a case of a capacity in terms of personnel, for example, the capacity information indicates at least one of the number of staff members, an ability of the staff, the number of items that can be cooked, and crowdedness of the store. The numerical value indicated by the capacity information may be changed depending on at least one of the time of the day and the day of the week.

FIG. 8 is a table for showing a data storage example of the user database DB2. As shown in FIG. 8, the user database DB2 is a database storing information on each of a plurality of users. The user database DB2 stores a user ID, and the name, a password, age, sex, an address, a phone number, an email address, uploaded data of a portrait, a feature amount of a face calculated based on the portrait, means of travel to the store, and payment information of the user. The user database DB2 can be updated through operation by the user.

The feature amount of the face is information obtained by converting features of the face into numerical values, and indicates relative positions, sizes, shapes, or other features of face parts, for example. In this embodiment, the feature amount of the face shown in the portrait is calculated in advance, but the feature amount of the face may be calculated on the spot at the time of authentication. When a plurality of portraits are registered, the feature amount of the face is calculated for each of the portraits.

Various methods are applicable to the face authentication itself, and for example, principal component analysis, linear discriminant analysis, elastic matching, a hidden Markov model, or other methods are applicable, and the feature amount may be calculated with a formula corresponding to one of those methods. For example, the feature amount of the face is expressed by a multidimensional vector, but may be expressed in other forms such as an array or a single numerical value.

In this embodiment, the feature amount of the face is an example of authentication information. The authentication information is information used in authentication. The authentication information may be any information corresponding to the authentication method, and may be, for example, a fingerprint pattern, a voice print pattern, a vein pattern, an autograph pattern, a password, a passcode, a PIN, or a secret word. Further, for example, at least one of a user ID, age, sex, an address, a phone number, and an email address may correspond to the authentication information. Still further, other information, for example, date of birth of the user, may be stored in advance in the user database DB2 so that the other information corresponds to the authentication information, for example.

The means of travel is a method of travel to the store. The means of travel may also be referred to as "means of transportation." For example, of a plurality of types of means of travel such as on foot, by bike, by car, by train, and by bus, means of travel specified by the user is stored in the user database DB2. When the user does not specify any means of travel, default means of travel (for example, on foot) is stored in the user database DB2. In this embodiment, a reference travel speed is defined for each means of travel.

The payment information is information used in electronic payment. The payment information may be any information used in payment, and is, for example, a credit card number, a debit card number, an account number of a bank account, an account associated with an electronic money or points, or identification information of a wallet registered on the web. In addition, the payment information may be an account of an electronic payment application or other information, for example.

FIG. 9 is a table for showing a data storage example of the order database DB3. As shown in FIG. 9, the order database DB3 is a database storing information on orders accepted by each of a plurality of stores. For example, the order database DB3 stores an order ID, a store ID, orderer information, order content information, scheduled time information, and receiver information. The order database DB3 is updated every time an order is accepted. The order database DB3 may store other information, for example, information indicating a current status of the order (such as "preparation of the items is complete" or "pickup of the items is complete").

The orderer information is information on an orderer. The orderer is a user who ordered items. For example, the orderer information includes at least one of a user ID, name, age, sex, a phone number, and an email address of the orderer. The order content information is information on details of ordered items. For example, the order content information includes an item ID, quantities, and presence or absence of an option of each of the ordered items.

The scheduled time information is information on scheduled time at which a receiver is to visit the store. In this embodiment, description is given of a case in which the scheduled time information indicates a time window having a fixed length, but the scheduled time information may indicate a pinpoint time instead of a time window. Alternatively, the time window indicated by the scheduled time information is not limited to 30 minutes as in this embodiment, and may have any length. For example, the time window may be shorter than 30 minutes, such as a time window in units of 5 minutes or 10 minutes, or may be longer than 30 minutes, such as 1 hour or 2 hours. The scheduled time information is only required to include at least one of a date and a time, and may include the date alone or the time alone, for example.

The receiver information is information on the receiver. The receiver is a user who is to pick up the items. In other words, the receiver is a user who is to actually visit the store. The receiver may also be referred to as "visitor." For example, the receiver information includes at least one of a user ID, name, age, sex, a phone number, and an email address of the receiver. In this embodiment, description is given of a case in which the orderer and the receiver are the same, but the orderer and the receiver may be different. When the orderer and the receiver are different, the orderer may specify the receiver, or the receiver may be automatically without being specified by the orderer. For example, the receiver may be an acquaintance of the orderer, such as a family member, a friend, or a colleague of the orderer, or may be a non-acquaintance of the orderer, for example, an item pickup agent.

FIG. 10 is a table for showing a data storage example of the item database DB4. As shown in FIG. 10, the item database DB4 is a database storing information on items of each of a plurality of stores. For example, the item database DB4 stores a store ID, an item ID, an item name, a price, an item image, and preparation time information. The item database DB4 can be updated by the staff.

The preparation time information is information on preparation time required to prepare the item. The preparation time information may be specified by the staff, or may be determined automatically depending on the type of the item. In this embodiment, the items are food and drink, and hence the preparation time information is a numerical value indicating time required to cook the item. In the data storage example of FIG. 10, the preparation time information indicates preparation time for one unit of the item, but the preparation time may be indicated for every two or more units. In this case, the preparation time information may be set so that as the number of units becomes larger, the preparation time becomes longer.

[Presentation Unit]

The presentation unit 101 is configured to present, to the user or a requester who requests the user to travel, options on time at which the user is to visit the store. In this embodiment, the orderer corresponds to the requester. Further, in this embodiment, description is given of the case in which the orderer and the receiver are the same user, and hence the presentation unit 101 presents the options to the user who is to visit the store.

The term "options" means images for selecting times or time windows indicated by the scheduled time information. In this embodiment, description is given of a case in which the buttons B40 of the confirmation screen G4 correspond to the options. For that reason, description of "buttons B40" in this embodiment can be read as "options." The options may be any other images, and may be check boxes, a pulldown menu, or radio buttons, for example.

As the options, times or time windows that can be candidates for the scheduled time information are shown. In the example of FIG. 2, the presentation unit 101 presents three buttons B40 as the options, and different time windows are shown thereon, respectively. The number of options presented by the presentation unit 101 is not limited to three as in FIG. 2, and may be any number. For example, the presentation unit 101 may present one option, two options, or four or more options. When the options indicate time windows, the time windows indicated by the individual options may partially overlap each other.

The times or time windows indicated by the options may be, of times or time windows at or in which the user can visit the store, shortest times or time windows, or later times or time windows. The phrase "times or time windows at or in which the user can visit the store" means times or time windows at or in which desired items or services can be provided. The times are times later than the time at which the user made a predetermined request (in this embodiment, ordered the items). A length of time from when the user made the request to when the user can visit the store may be a fixed value or a variable value. In this embodiment, the length is a variable value, and is determined depending on the items in the shopping cart, for example.

The presentation by the presentation unit 101 may be made by, in addition to a visual method using the images, an aural method using voices. Further, in this embodiment, the presentation unit 101 is achieved by the server 10, and hence the presentation unit 101 makes the presentation by transmitting, to the user terminal 20, data for displaying the buttons B40 (such as image data of the buttons B40 and HTML data). When the presentation is made by the aural method, the presentation unit 101 may make the presentation by transmitting, to the user terminal 20, audio data indicating the times or time windows.

In this embodiment, the presentation unit 101 presents the buttons B40 to the user or the requester based on the preparation time information on time required for preparation in the store. The phrase "preparation in the store" means preparation of items or services provided at the store. When food and drink correspond to the items as in this embodiment, cooking and wrapping the food and drink correspond to the preparation. The time required for preparation is time required from when the preparation is started to when the preparation is complete.

For example, the presentation unit 101 calculates the time required for preparation based on at least one of the number and types of items that the user has put in the shopping cart, and acquires the calculated time as the preparation time information. For example, as the number of items becomes larger, the time required for preparation becomes longer. Further, for example, in the presentation unit 101, when the items are of a predetermined type that takes a larger amount of work, the time required for preparation becomes relatively longer.

In this embodiment, the preparation time information of individual items is defined in the item database DB4, and hence the presentation unit 101 presents the buttons B40 based on the preparation time information associated with the items that the user has put in the shopping cart. For example, the presentation unit 101 adds, to the current time, a total value of times indicated by the preparation time information associated with the items that the user has put in the shopping cart to calculate time at which the user can visit the store. The presentation unit 101 presents the buttons B40 for selecting the time or later time windows.

In this embodiment, the presentation unit 101 presents the buttons B40 to the user or the requester based on the capacity information on the capacity at the store. When the capacity indicated by the capacity information changes depending on the time or time window, the presentation unit 101 calculates the time required for preparation based on the capacity information corresponding to the time or time window at or in which the user is to visit the store.

For example, in the case of the capacity in terms of facilities, as the number of pickup boxes 40 indicated by the capacity information becomes larger, the times or time windows indicated by the buttons B40 become earlier. Further, for example, as the size of the pickup box 40 indicated by the capacity information becomes larger, the times or time windows indicated by the buttons B40 become earlier. Still further, for example, as the number of items that can be stored in the pickup box 40 indicated by the capacity information becomes larger, the times or time windows indicated by the buttons B40 become earlier.

For example, the presentation unit 101 determines time windows in which the pickup box 40 is available based on the order database DB3 and the capacity information, and presents buttons B40 indicating the determined time windows. The time windows in which the pickup box 40 is available means that a total number of items that can be stored, which is determined based on the capacity information, is less than the number of items of orders accepted in the time window.

Meanwhile, for example, in the case of the capacity in terms of personnel, as the number of staff members indicated by the capacity information becomes larger, the times or time windows indicated by the buttons B40 become earlier. Further, for example, as the ability of the staff indicated by the capacity information becomes higher, the times or time windows indicated by the buttons B40 become earlier. Still further, for example, as the number of items that can be cooked, which is indicated by the capacity information, becomes larger, the times or time windows indicated by the buttons B40 become earlier. Yet further, for example, as the crowdedness of the store indicated by the capacity information becomes less crowded, the times or time windows indicated by the buttons B40 become earlier.

In this embodiment, the presentation unit 101 presents the buttons B40 to the user or the requester based on travel time information on time required to travel to the store. This travel is travel from a predetermined departure point to the store. For example, the departure point is an address of the user specified as the receiver, or coordinate information (for example, latitude/longitude information) corresponding to the address. Further, for example, the user terminal 20 may include a GPS receiver, and the departure point may be current position information detected with the use of the GPS receiver. As each of the method of determining the position, and the method of calculating the time required to travel, a known method can be used. The time required to travel may be calculated through division of a distance along a route from the departure point to the store by a predetermined speed.

The means of travel may be fixed to be unchangeable, but any means of travel can be specified in this embodiment. Accordingly, the presentation unit 101 acquires the travel time information based on, of the plurality of means of travel, the means of travel specified by the user or the requester. The presentation unit 101 acquires the travel time information based on a travel speed associated with the specified means of travel. It is assumed that a relationship between the means of travel and the travel speed is stored in advance in the data storage unit 100. The presentation unit 101 divides the distance from the departure point to the store by the travel speed associated with the specified means of travel to acquire the travel time information.

[Acquisition Unit]

The acquisition unit 102 is configured to acquire the scheduled time information based on the button B40 selected by the user or the requester. In this embodiment, the acquisition unit 102 acquires, as the scheduled time information, the time window indicated by the selected button B40. It is assumed that the data storage unit 100 stores association between information identifying the individual buttons B40, and the time windows indicated by the buttons B40. The acquisition unit 102 acquires, as the scheduled time information, the time window associated with the button B40 selected by the user.

[Registration Unit]

The registration unit 103 is configured to register, in the data storage unit 100, user information on a user who is to visit a predetermined store, and scheduled time information on scheduled time at which the user is to visit the store, in association with each other. The term "association" means allowing one piece of information to be used to retrieve another piece of information. In this embodiment, storing the user information and the scheduled time information in the same record of the order database DB3 corresponds to the association therebetween.

The user information is authentication information corresponding to an index (correct answer) in authentication, or information associated with the authentication information. In this embodiment, description is given of a case in which the user ID stored in the order database DB3 corresponds to the user information. For that reason, description of "user ID stored in the order database DB3" in this embodiment can be read as "user information."

The user information may be information of any type. For example, the user information may be at least one of name, date of birth, a phone number, and an email address, or the authentication information itself, such as a feature amount of the face, a password, a passcode, a PIN, or a secret word.

The term "registration" means recording in the data storage unit 100. In this embodiment, storing information in the order database DB3 corresponds to the registration. In this embodiment, when an order is accepted, the registration unit 103 generates an order ID so as not to duplicate those of other orders, and registers the store ID of the store in which the user placed the order, the orderer information, the order content information, the scheduled time information, and the receiver information in association with one another in the order database DB3. The scheduled time information is acquired by the acquisition unit 102. Other information may be acquired with the use of information received from the user terminal 20 (for example, the user ID of the user and information indicating contents of the shopping cart), the store database DB1, the user database DB2, and the item database DB4.

In this embodiment, a plurality of users may visit one store, and hence the registration unit 103 registers a user ID of each of the plurality of users who are to visit the store, and scheduled time information on scheduled times at which the users are to visit the store, in association with each other in the order database DB3. In other words, the registration unit 103 registers, for each of the users who are to visit the store, the user ID and the scheduled time information in association with each other in the order database DB3.

In this embodiment, orders for each of a plurality of stores are accepted, and hence the registration unit 103 registers, in association with each of the plurality of stores, a user ID of a user who is to visit the store, and scheduled time information on scheduled time at which the user is to visit the store, in the order database DB3. In other words, the registration unit 103 registers, for each of the stores, the user ID and the scheduled time information in association with each other in the order database DB3.

In this embodiment, one of the buttons B40 is selected by the user or the requester, and the scheduled time information is acquired by the acquisition unit 102. Thus, the registration unit 103 registers the scheduled time information acquired by the acquisition unit 102 in the order database DB3. Instead of being selected by the user or the requester, the scheduled time information may be determined automatically on the server 10 side.

In this embodiment, biometric authentication is executed, and hence the registration unit 103 registers biometric information of the user, or identification information of the user for acquiring the biometric information as the user information in the order database DB3. This embodiment takes as an example a case in which the user ID corresponds to the identification information, but the identification information may be any other information, for example, a name. Further, in this embodiment, description is given of a case in which the user ID, which is an example of the identification information, is stored in the order database DB3, but a feature amount of a face, which is an example of the biometric information, may be stored in the order database DB3.

[Authentication Unit]

The authentication unit 104 executes, when someone visits the store, authentication based on visitor information on the someone, the user ID registered by the registration unit 103, visit time information on time at which the someone visits the store, and the scheduled time information registered by the registration unit 103. The term "someone" means a person who has visited the store. The store may be visited by the user or an outsider. From the view of the authentication system S, at a time point at which someone visits the store, it is not known who the person is, and hence description is given as described above in this embodiment.

The visitor information is authentication information of the person who has visited the store. Stated differently, the visitor information is authentication information corresponding to a query in authentication. In this embodiment, description is given of a case in which a feature amount of a face of the person who has visited the store corresponds to the visitor information, but the visitor information may be any authentication information depending on the authentication method used. For example, the visitor information may be at least one of a user ID, name, date of birth, a phone number, and an email address, or may be other authentication information, such as another piece of biometric information, for example, a fingerprint pattern, a password, a passcode, a PIN, a two-dimensional code, or a secret word.

The authentication unit 104 acquires the visitor information with the use of a device in the store. In this embodiment, the pickup box 40 is described as an example of the device. However, the device may be any device in the store, and may be, for example, the store terminal 30, or a user terminal 20 possessed by the user who has come to the store.

For example, the authentication unit 104 calculates the feature amount of the face of the person who has visited the store based on a taken image obtained as a result of photographing by the photographing unit 46 of the pickup box 40, and acquires the calculated feature amount as the visitor information. The taken image itself may correspond to the visitor information. Alternatively, when the visitor information can be acquired with the use of a component other than the photographing unit 46, the visitor information may be acquired with the use of the other component. For example, the visitor information may be acquired with the use of the communication unit 43, the operation unit 44, or a sensor (such as a fingerprint sensor or an infrared sensor) capable of detecting a physical quantity in nature.

The visit time information is the current time when the authentication unit 104 executes authentication, times before and after the current time, or a time window thereof. In this embodiment, when someone visits the store, a taken image is transmitted from the pickup box 40 to the server 10 and the authentication is started. As a result, the visit time information is the current time when the server 10 receives the taken image. The current time may be acquired with the use of a real-time clock or the GPS, for example. The visit time information may indicate another time or time window, for example, a time at which the taken image was taken.

In this embodiment, the user information registered by the registration unit 103 is not the authentication information itself, but the user ID of the user who is the receiver (user ID included in the receiver information stored in the order database DB3). For that reason, the authentication unit 104 refers to the user database DB2, and acquires authentication information of the receiver associated with the user ID registered by the registration unit 103. The authentication unit 104 determines that the authentication is successful when the visitor information and the authentication information of the receiver match or are similar, and the visit time information and the scheduled time information correspond to each other.

When the visitor information and the authentication information of the receiver do not match or are not similar, or when the visit time information and the scheduled time information do not correspond to each other, the authentication unit 104 determines that the authentication has failed. In other words, in order for the authentication to be successful, it is required to satisfy the following two conditions: the visitor information and the authentication information of the receiver match or are similar, and the visit time information and the scheduled time information correspond to each other, and the authentication is unsuccessful even when only one of the two conditions is satisfied.

The phrase "the visitor information and the authentication information of the receiver match" means that the visitor information and the authentication information of the receiver are the same. For example, in a case of an authentication method in which perfect matching is required as in password authentication, passcode authentication, or PIN authentication, in order for the authentication to be successful, it is required that the visitor information and the authentication information of the receiver match.

The phrase "the visitor information and the authentication information of the receiver are similar" means that a difference between the visitor information and the authentication information of the receiver is less than a threshold value, or that the visitor information and the authentication information of the receiver partially match. In a case of an authentication method in which determination is made based on similarity of the authentication information as in the biometric authentication, in order for the authentication to be successful, it is required that the visitor information and the authentication information of the receiver be similar. In such an authentication method, it is rare that the authentication information matches perfectly, but the authentication is successful also when the authentication information matches perfectly.

The phrase "the visit time information and the scheduled time information correspond to each other" means that the visit time information and the scheduled time information match, or that a deviation in time between the visit time information and the scheduled time information is less than a threshold value. In this embodiment, the time indicated by the visit time information being included in the time window indicated by the scheduled time information corresponds to the visit time information and the scheduled time information corresponding to each other. In a case in which the scheduled time information indicates a time instead of a time window, the time indicated by the visit time information and the time indicated by the scheduled time information matching, or a time difference therebetween being less than a threshold value corresponds to the visit time information and the scheduled time information corresponding to each other.

In this embodiment, a plurality of users may visit one store, and hence the authentication unit 104 executes authentication based on the visitor information and, of user IDs of the plurality of users, a user ID with which the scheduled time information corresponding to the visit time information is associated. In other words, of user IDs registered in the order database DB3, the user ID with which the scheduled time information corresponding to the visit time information is associated is used in the authentication.

In this embodiment, orders for each of a plurality of stores are accepted, and hence, when someone has visited one of the plurality of stores, the authentication unit 104 executes authentication based on visitor information on the person who has visited the store, a user ID associated with the store, visit time information on time at which someone visits the store, and scheduled time information associated with the store. In other words, of the user IDs and the scheduled time information registered in the order database DB3, the user ID and the scheduled time information with which the store ID of the store that someone has visited is associated are used in the authentication.

In this embodiment, the visitor information is biometric information of the person who has visited the store, and hence the authentication unit 104 executes the authentication based on the biometric information of the person who has visited the store, the biometric information of the user, the visit time information, and the scheduled time information.

[Permission Unit]

The permission unit 105 permits, when the authentication by the authentication unit 104 is successful, execution of predetermined processing. In this embodiment, the store at which the user picks up the items corresponds to the predetermined location, the information on the scheduled time at which the user is to visit the store corresponds to the scheduled time information, and information on time at which someone visits the store corresponds to the visit time information. Consequently, the permission unit 105 permits the pickup of the items at the store when the authentication is successful.

In this embodiment, the permission unit 105 permits the pickup of the items by transmitting, to the pickup box 40, a notification that the authentication is successful. The permission unit 105 may permit the pickup of the items by transmitting the notification to another computer, for example, the store terminal 30. Further, the predetermined processing permitted by the permission unit 105 is not limited to the transmission of the notification. The predetermined processing may be any processing depending on a situation to which the authentication system S is applied, and other examples of the predetermined processing are described later in the modification examples.

[3-2. Functions Achieved in User Terminal]

As illustrated in FIG. 6, a data storage unit 200 and a reception unit 201 are achieved in the user terminal 20. The data storage unit 200 is mainly achieved by the storage unit 22. The reception unit 201 is mainly achieved by the control unit 21.

[Data Storage Unit]

The data storage unit 200 is configured to store data required to order items. For example, the data storage unit 200 stores an IP address of the server 10 and other information. Further, for example, a data storage unit 300 stores the application for accepting the order.

[Reception Unit]

The reception unit 201 is configured to receive various operations. For example, the reception unit 201 is configured to receive selection of a button B40. The reception unit 201 transmits, to the server 10, information for identifying the selected button B40. The operation received by the reception unit 201 is not limited to the selection of the button B40, and may be various other operations.

[3-3. Functions Achieved in Store Terminal]

As illustrated in FIG. 6, a data storage unit 300 and a notification unit 301 are achieved in the store terminal 30. The data storage unit 300 is mainly achieved by the storage unit 32. The notification unit 301 is mainly achieved by the control unit 31.

[Data Storage Unit]

The data storage unit 300 is mainly achieved by the storage unit 32. The data storage unit 300 is configured to store data required for store operation. For example, the data storage unit 300 stores the IP address of the server 10 and other information. Further, for example, the data storage unit 300 stores an application for supporting the store operation.

[Notification Unit]

When the authentication by the authentication unit 104 has failed, the notification unit 301 issues a predetermined notification to the staff. In this embodiment, description is given of a case in which the predetermined notification is the notification screen G6, but the predetermined notification may be any notification that the authentication has failed. For example, transmitting a predetermined message through use of an electronic mail, an SNS, or the like may correspond to the issuing of the predetermined notification, or issuing a push notification in the store terminal 30 may correspond to the issuing of the predetermined notification.

[3-4. Functions Achieved in Pickup Box]

As illustrated in FIG. 6, a data storage unit 400 and an execution unit 401 are achieved in the pickup box 40. The data storage unit 400 is mainly achieved by the storage unit 42. The execution unit 401 is mainly achieved by the control unit 41.

[Data Storage Unit]

The data storage unit 400 is configured to store data required for the authentication. For example, the data storage unit 400 stores the IP address of the server 10 and other information. Further, for example, the data storage unit 400 stores a program for unlocking the pickup box 40 when the notification that the authentication is successful is received from the server 10.

[Execution Unit]

The execution unit 401 transmits, to the server 10, the taken image obtained as a result of photographing by the photographing unit 46. The execution unit 401 receives a result of the authentication from the server 10. When the notification that the authentication is successful is received, the execution unit 401 unlocks the pickup box 40. It is only required that the execution unit 401 execute processing permitted when the authentication is successful, and the processing executed by the execution unit 401 is not limited to the unlocking. For example, when the pickup box 40 can be unlocked from the operation unit 44, the processing executed by the execution unit 401 may be processing of prompting the staff to unlock the pickup box 40. Alternatively, for example, the processing executed by the execution unit 401 may be processing of causing the display unit 45 to display a predetermined message.

[4. Processing Executed in Authentication System]

Next, processing executed in the authentication system S is described. Here, description is given of order processing for ordering items, and pickup processing for picking up the items. The processing described below is an example of processing executed by the functional blocks illustrated in FIG. 6.

[4-1. Order Processing]

Figure 11:
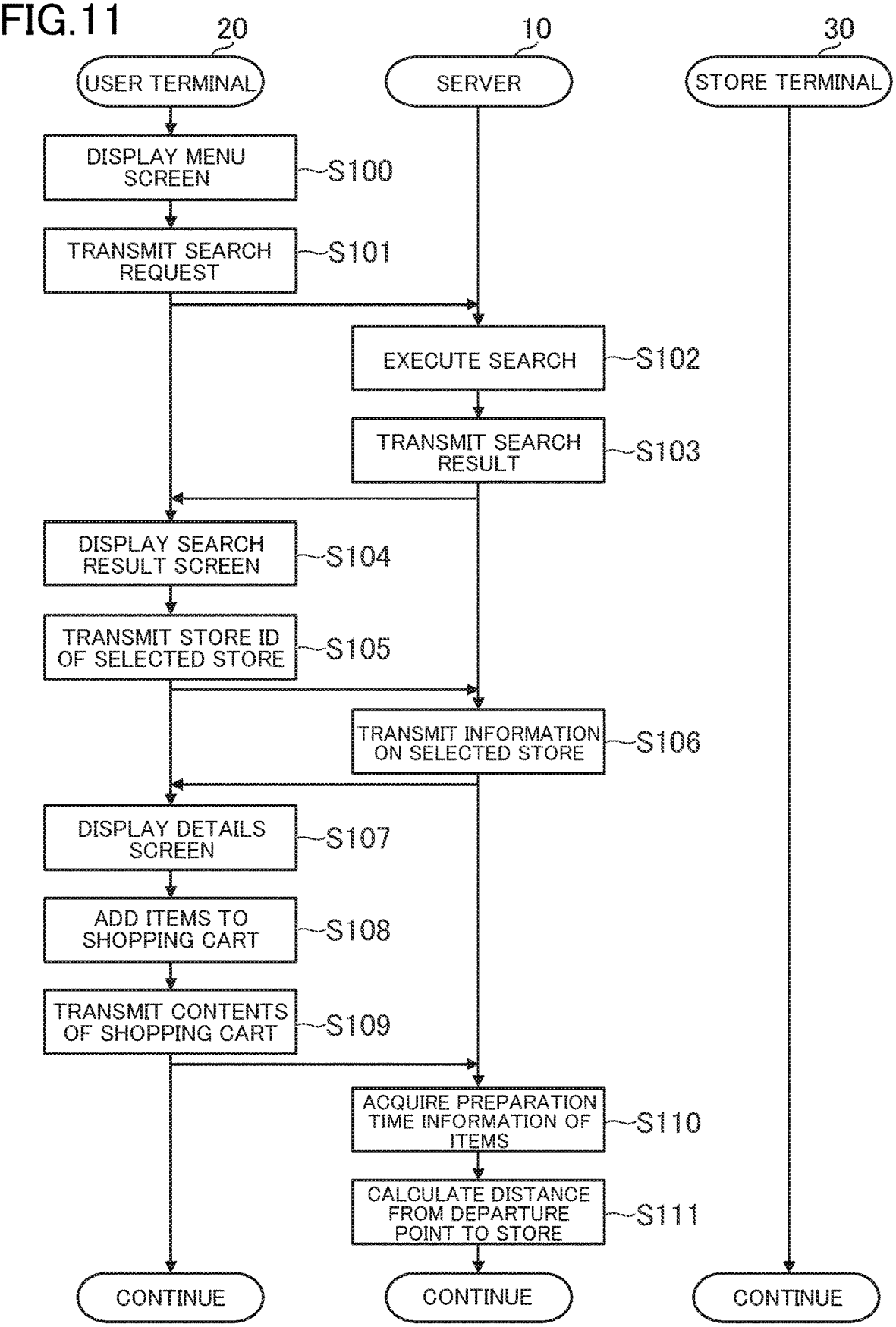
FIG. 11 is a flow chart for illustrating an example of order processing.
Figure 12:
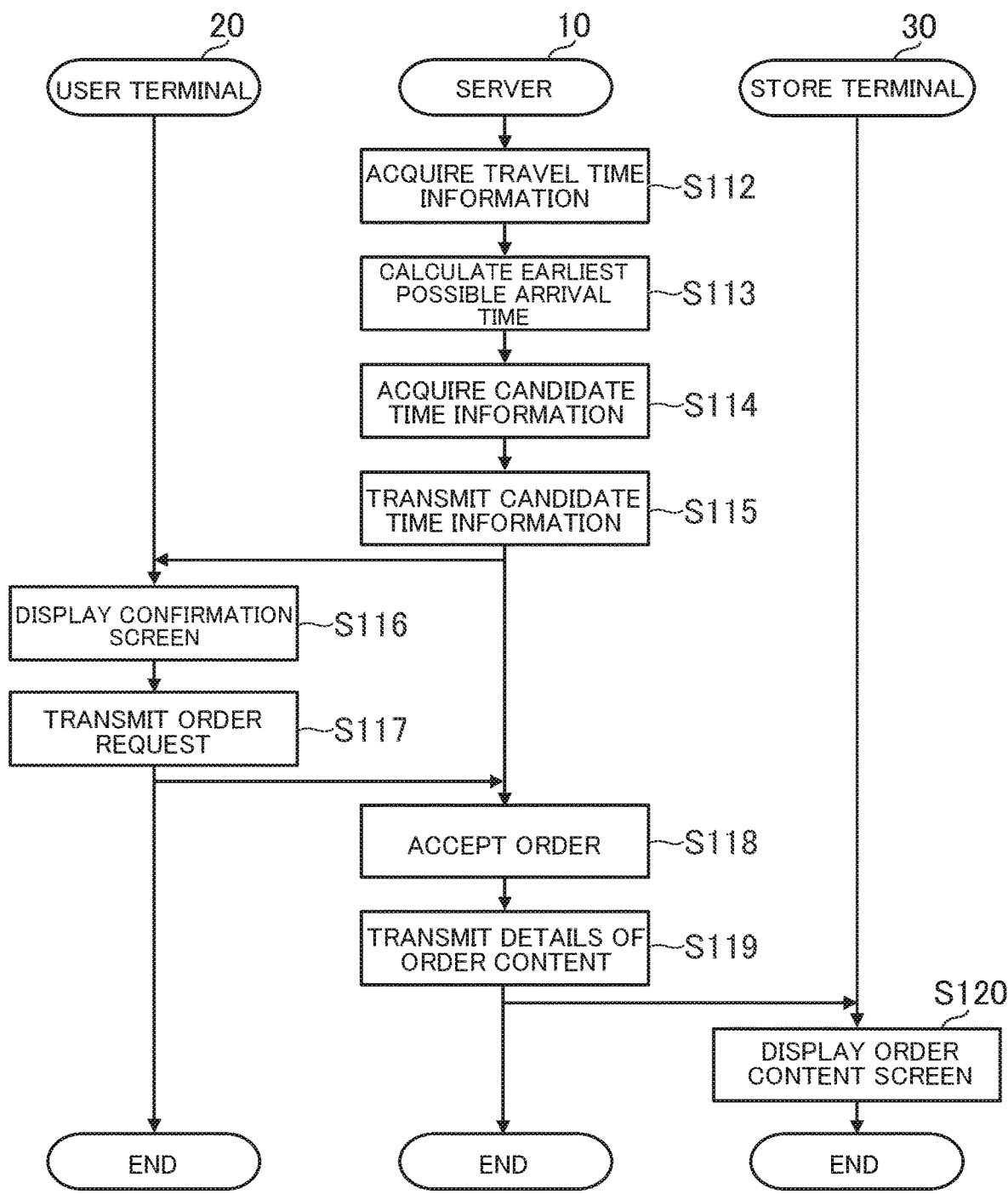
FIG. 12 is a flow chart for illustrating the example of the order processing.

FIG. 11 and FIG. 12 are flow charts for illustrating an example of the order processing. The order processing illustrated in FIG. 11 and FIG. 12 is executed by the control units 11, 21, and 31 operating in accordance with the programs stored in the storage units 12, 22, and 32, respectively. The order processing is executed when the application installed in the user terminal 20 is started. The user may be required to log in when the application is started, or log-in may be executed automatically based on information stored in the user terminal 20. When some information is transmitted from the user terminal 20 to the server 10, the user ID is also transmitted.

As illustrated in FIG. 11, the user terminal 20 displays the menu screen G1 on the display unit 25 (Step S100). When the menu screen G1 is displayed in Step S100, the user terminal 20 receives inputs of the search conditions in the input forms F10 and F11.

When the search conditions are input in the input forms F10 and F11 and the button B12 is selected, the user terminal 20 transmits a search request to the server 10 (Step S101). The search request is a request for searching for at least one of a store and items, and is made by transmitting data having a predetermined format. The search request includes the search conditions input by the user.

When the search request is received, the server 10 executes a search based on the search conditions input by the user, and the store database DB1 (Step S102), and transmits search results to the user terminal 20 (Step S103). In Step S102, the server 10 executes the search with the use of the search conditions as queries, and information, for example, the address, stored in the store database DB1 as indices. The search results transmitted in Step S103 include a store ID, a store name, a store image, and other information of a store hit in the search. In other words, the search results include the information displayed on the search result screen G2.

When the search results are received, the user terminal 20 displays the search result screen G2 on the display unit 25 (Step S104). When the search result screen G2 is displayed in Step S104, the user terminal 20 receives selection of a store shown in the list L20. When a store is selected from the list L20, the user terminal 20 transmits, to the server 10, a store ID of the store selected by the user (Step S105).

When the store ID is received, the server 10 transmits, to the user terminal 20, information on the store selected by the user based on the store database DB1 (Step S106). This information may be any information on the store selected by the user, and may include the store name, the genre, the address, the item names, the prices, and the item image, for example. In other words, this information includes the information displayed on the details screen G3.

When the information on the store selected by the user is received, the user terminal 20 displays the details screen G3 on the display unit 25 (Step S107). When the details screen G3 is displayed in Step S107, the user terminal 20 receives selection of items shown in the list L30.

When items are selected from the list L30, the user terminal 20 adds, with respect to the server 10, the items selected by the user to the shopping cart (Step S108). When a predetermined operation for proceeding to the confirmation screen G4 is performed, the user terminal 20 transmits contents of the shopping cart to the server 10 (Step S109). The contents of the shopping cart are stored in the storage unit 22, and for example, item IDs and quantities of the items selected by the user are stored. The store ID of the store that sells the items may be stored in the contents of the shopping cart.

When the contents of the shopping cart are received, the server 10 acquires preparation time information of the items in the shopping cart based on the store database DB1 and the item database DB4 (Step S110). In Step S110, the server 10 calculates, based on capacity information of the store stored in the store database DB1, and the preparation time information of the individual items stored in the item database DB4, a total value of cooking time required to complete cooking of all the items in the shopping cart, and acquires the calculated total value as the preparation time information.

The server 10 calculates, based on the store database DB1 and the user database DB2, a distance from the departure point to the store (Step S111). In Step S111, the server 10 calculates a distance between latitude/longitude information corresponding to the address of the store stored in the store database DB1, and latitude/longitude information corresponding to the address of the user stored in the user database DB2.

Transitioning to FIG. 12, the server 10 acquires travel time information based on the user database DB2 and the distance calculated in Step S111 (Step S112). In Step S112, the server 10 calculates travel time by dividing the distance calculated in Step S111 by a speed corresponding to the means of travel stored in the user database DB2.

The server 10 calculates earliest possible arrival time based on the current time acquired with the use of the real-time clock, for example, the preparation time information acquired in Step S110, and the travel time information calculated in Step S111 (Step S113). In Step S113, the server 10 calculates the earliest possible arrival time by adding, to the current time, longer one of the time indicated by the preparation time information and the time indicated by the travel time information.

The server 10 acquires, based on the store database DB1, the order database DB3, and the earliest time calculated in Step S113, candidate time information on candidate times indicated by the buttons B40 (Step S114). In Step S114, the server 10 determines, of time windows at or after the earliest time, a predetermined number of time windows in which the pickup box 40 is available, as the candidate time information based on capacity information of the pickup box 40 stored in the store database DB1, and the ordered contents stored in the order database DB3. For example, the server 10 increments the earliest time by 30 minutes, and checks availability of the pickup box 40 in the time window. When the pickup box 40 is available, the server 10 acquires the time window as a candidate, and when the pickup box 40 is not available, the server 10 checks availability for the next 30 minutes. The server 10 repeats those processes until the predetermined number of (in this embodiment, three) candidates are found.

The server 10 transmits, to the user terminal 20, the candidate time information acquired in Step S114 (Step S115). In Step S114, the information to be displayed in the confirmation screen G4 (that is, information for displaying buttons B40 corresponding to the candidate time information) is transmitted.

When the candidate time information is received, the user terminal 20 displays the confirmation screen G4 on the display unit 25 (Step S116). When the confirmation screen G4 is displayed in Step S116, the user terminal 20 receives selection of a button B40.

When the button B41 is selected under a state in which any one of the buttons B40 is selected by the user, the user terminal 20 transmits an order request to the server 10 (Step S117). The order request is a request for confirming the order, and is made by transmitting data having a predetermined format. The order request includes information for identifying the scheduled time information selected by the user.

When the order request is received, the server 10 executes processing of accepting the order based on the user database DB2, and registers the user ID, the scheduled time information, and the like (Step S118). In Step S118, the server 10 executes payment processing, and registers, based on the information included in the order request, the order ID, the store ID, the orderer information, the order content information, the scheduled time information, and the receiver information corresponding to the accepted order, in association with each other in the order database DB3.

The server 10 transmits details of the order content to the store terminal 30 (Step S119). When the details are received, the store terminal 30 displays the order content screen G5 on the display unit 35 (Step S120), and the processing ends.

[4-2. Pickup Processing]

Figure 13:
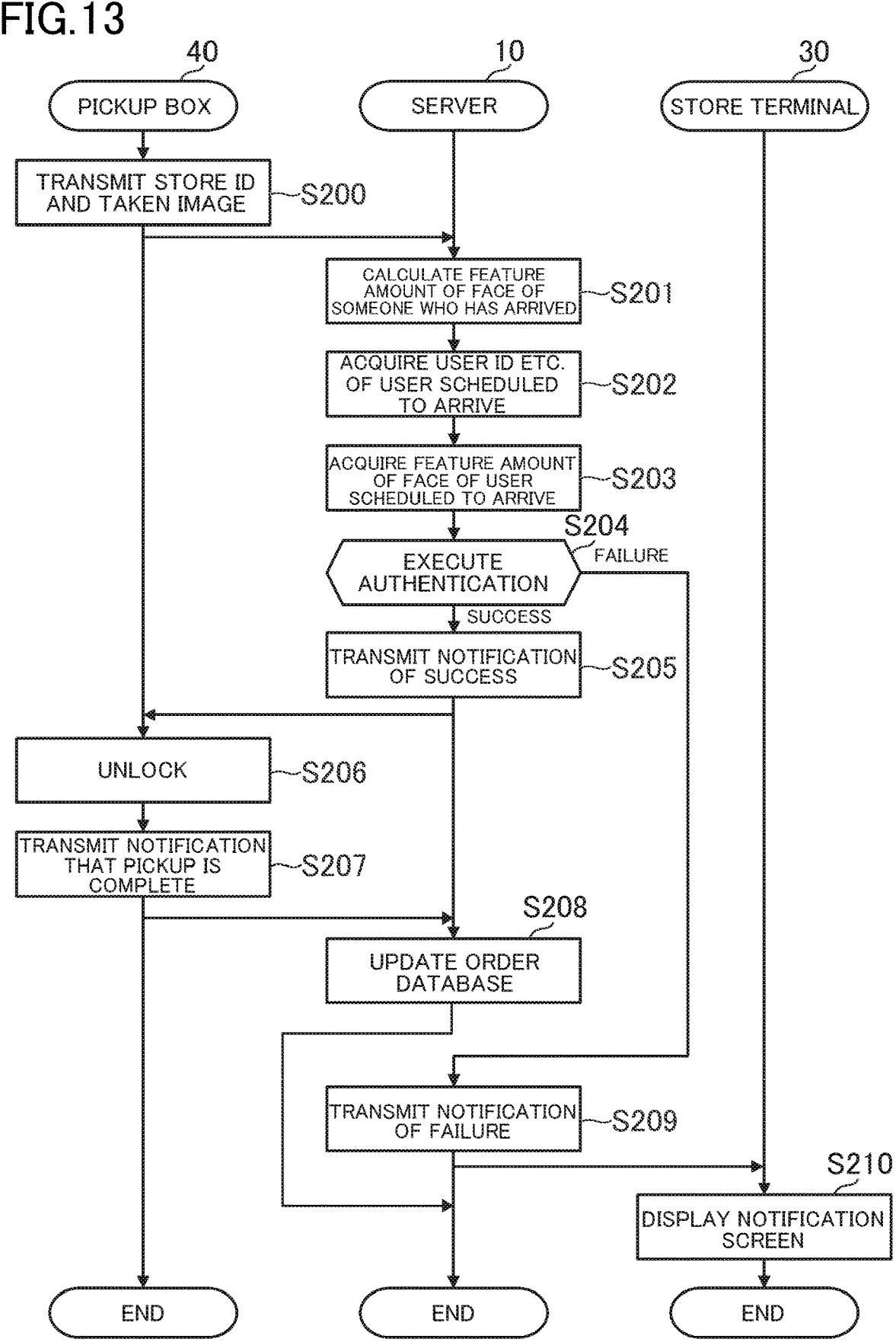
FIG. 13 is a flowchart for illustrating an example of pickup processing.

FIG. 13 is a flow chart for illustrating an example of the pickup processing. The pickup processing illustrated in FIG. 13 is executed by the control units 11, 31, and 41 operating in accordance with the programs stored in the storage units 12, 32, and 42, respectively. The pickup processing may be executed at a suitable timing, and may be executed, for example, when a predetermined operation is received on the operation unit 44 of the pickup box 40. Alternatively, for example, a human detection sensor may be mounted in advance on the pickup box 40, and the pickup processing may be executed when the human detection sensor detects someone approaching the human detection sensor.

As illustrated in FIG. 13, the pickup box 40 transmits, to the server 10, the store ID, and a taken image obtained as a result of photographing by the photographing unit 46 (Step S200). It is assumed that the store ID is stored in the storage unit 42.

When the store ID and the taken image are received, the server 10 calculates, based on the received taken image, a feature amount of a face of someone who has arrived at the store (Step S201). The feature amount of the face calculated in Step S201 is an example of the visitor information.

The server 10 acquires the current time as the visit time information, and acquires, based on the order database DB3, and the store ID received in Step S201, a user ID of a user who is scheduled to arrive at the store at the current time (Step S202). In Step S202, the server 10 refers to the order database DB3 to acquire the user ID with which the store ID received from the pickup box 40, and the scheduled time information corresponding to the visit time information are associated.

The server 10 acquires, based on the user database DB2, and the user ID received from the pickup box 40, a feature amount of a face of the user who is scheduled to arrive at the store at the current time (Step S203). In Step S203, the server 10 refers to the user database DB2 to acquire the feature amount associated with the user ID acquired in Step S202. When a plurality of user IDs are acquired in Step S202, a corresponding number of feature amounts are acquired.

The server 10 executes authentication based on the feature amount calculated in Step S201, and the feature amount acquired in Step S203 (Step S204). In Step S204, the server 10 calculates a distance between those two feature amounts. When the distance is less than a threshold value, the server 10 determines that the authentication is successful. When the distance is the threshold value or more, the server 10 determines that the authentication has failed.

When the authentication is successful (Step S204: success), the server 10 transmits a notification of success to the pickup box 40 (Step S205). The notification of success is a notification indicating that the authentication is successful, and is issued by transmitting data having a predetermined format.

When the notification of success is received, the pickup box 40 unlocks the door on the front side (Step S206). In Step S206, the pickup box 40 may automatically open the door on the front side that has been unlocked. Thereafter, the user takes out the items in the pickup box 40. After taking out the items, the user closes the door on the front side of the pickup box 40. When the door on the front side is closed, the pickup box 40 transmits a pickup completion notification to the server 10 (Step S207). The pickup completion notification is a notification that the pickup of the items is complete, and is issued by transmitting data having a predetermined format. When the pickup completion notification is received, the server 10 updates the order database DB3 (Step S208), and the processing ends. In Step S208, a record corresponding to the order for which the pickup is complete may be deleted from the order database DB3, or in a case in which information indicating a pickup status (for example, "before pickup" or "picked up") is stored in the order database DB3, the information may be updated to "picked up."

Meanwhile, when the authentication has failed (Step S204: failure), the server 10 transmits a notification of failure to the store terminal 30 (Step S209). The notification of failure is a notification that the authentication is successful, and is issued by transmitting data having a predetermined format. When the notification of failure is received, the store terminal 30 displays the notification screen G6 on the display unit 35 (Step S210), and the processing ends. When the staff finishes helping as instructed in the manual and selects the button B60, the store terminal 30 notifies the server 10 thereof, and the order database DB3 is updated as in Step S208.

According to the authentication system S of this embodiment, when someone has visited the store, the authentication is executed based on the visitor information, the user ID registered in the order database DB3, the visit time information, and the scheduled time information. Consequently, not only simple face authentication is executed, but also temporal factors are considered so that security can be improved. For example, even when a malicious outsider who resembles the user in face has visited the store, the authentication is not successful and the items cannot be picked up unless in the time window indicated by the scheduled time information, and hence the security can be improved.

Further, with the authentication system S executing the authentication based on the visitor information and, of the user IDs of the plurality of users, the user ID with which the scheduled time information corresponding to the visit time information is associated, even when the plurality of users are to visit the store, the authentication can be executed also in consideration of the temporal factors, and hence the security can be improved.

Still further, when someone has visited any one of the plurality of stores, with the authentication system S executing the authentication based on the visitor information on the someone who has visited the store, the user ID associated with the store, the visit time information on time at which someone arrived at the store, and the scheduled time information associated with the store, even when each of a plurality of stores accept orders, the authentication can be executed also in consideration of the temporal factors, and hence the security can be improved.

Yet further, with the authentication system S acquiring the scheduled time information based on the button B40 selected by the user, and registering the scheduled time information in the order database DB3, the user can be allowed to select a desired time or time window, and hence convenience of the user can be increased. As a result, the user can pick up the items more reliably, and a turnover rate of the pickup box 40 can be increased.

Yet further, with the authentication system S presenting the buttons B40 to the user based on the preparation time information, the buttons B40 of the times or time windows at or in which the user who is to arrive the store can pick up the items reliably can be presented also in consideration of the time required to prepare the items ordered by the user. As a result, the user who has visited the store is not required to wait, and hence convenience of the user can be increased.

Yet further, with the authentication system S presenting the buttons B40 to the user based on the capacity information, the buttons B40 of the times or time windows at or in which the user who is to visit the store can pick up the items reliably can be presented in consideration of the capacity in terms of facilities and the capacity in terms of personnel of the store. As a result, the user who has arrived at the store is not required to wait, and hence convenience of the user can be increased.

Yet further, with the authentication system S presenting the buttons B40 to the user based on the travel time information, the buttons B40 of the times or time windows at or in which the user who is to arrive at the store can pickup the items reliably can be presented in consideration of time required for the user to travel to the store. As a result, it is possible to prevent a situation in which the user cannot be in time for the time or time window specified by himself or herself, and hence convenience of the user can be increased.

Yet further, with the authentication system S acquiring the travel time information based on, of the plurality of means of travel, the means of travel specified by the user, correct travel time information can be acquired in consideration of actual means of travel used by the user to the store. As a result, reliability that the user who has arrived at the store picks up the items can be further increased.

Yet further, with the authentication system S executing the authentication based on the biometric information of the person who has visited the store, the biometric information of the user, the visit time information, and the scheduled time information, even when the user visits the store empty-handed, authentication with high security can be executed.

Yet further, with the authentication system S permitting the pickup of the items at the store when the authentication is successful, the authentic user is allowed to pick up the items reliably. In addition, the user can pick up the items without contacting the staff, and hence convenience on the store side is also increased as a measure against infectious diseases.

5. Modification Examples

The present disclosure is not limited to the embodiment described above, and can be modified suitably without departing from the spirit of the present disclosure.

Figure 14:
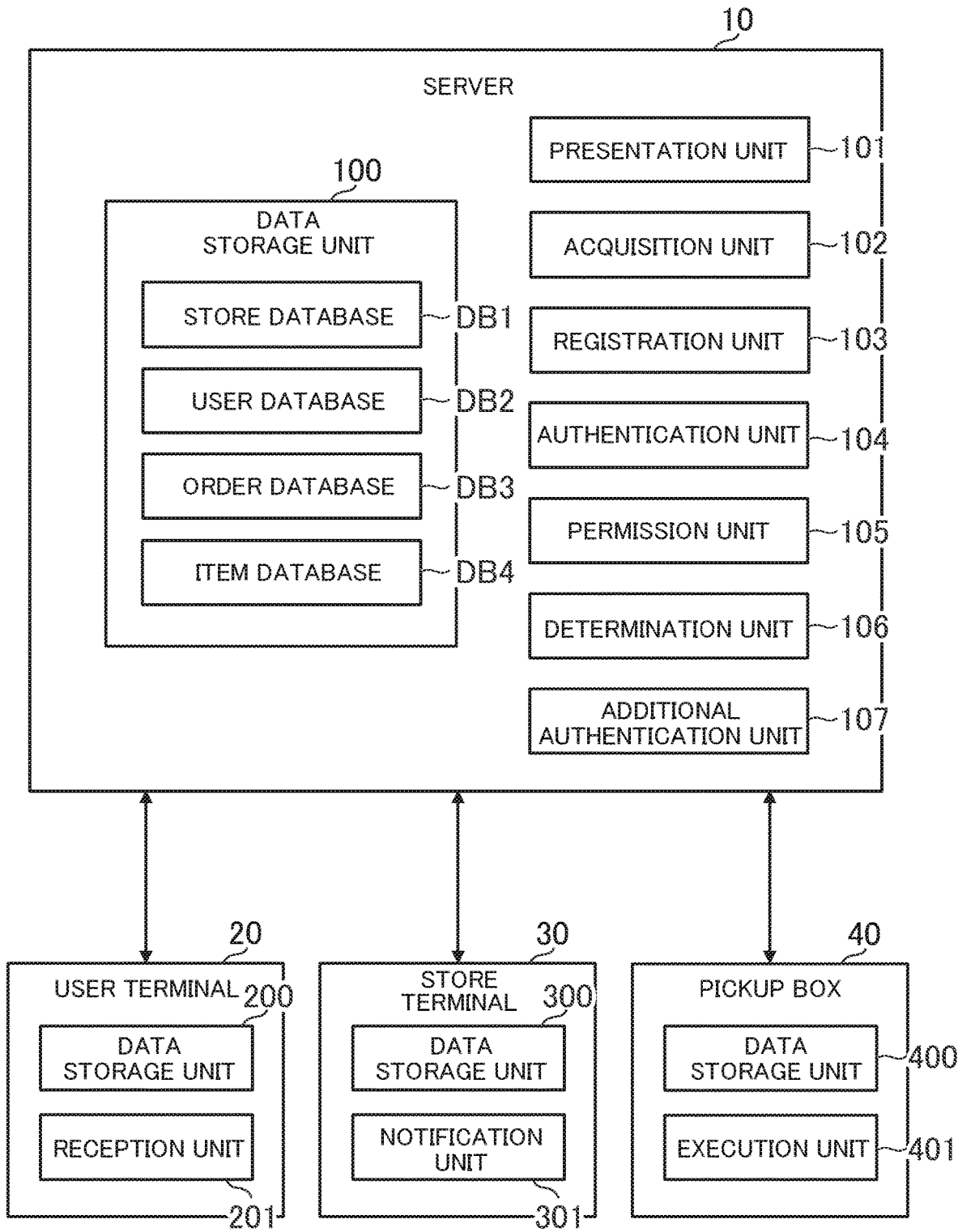
FIG. 14 is a functional block diagram in modification examples of the present disclosure.

FIG. 14 is a functional block diagram in modification examples of the present disclosure. As illustrated in FIG. 14, in the modification examples described below, a determination unit 106 and an additional authentication unit 107 are achieved in addition to the functions described in the embodiment. Each of the determination unit 106 and the additional authentication unit 107 is achieved mainly by the control unit 11.

(1) For example, it is assumed that a user A, and another user B who resembles the user A in face have ordered items at the same store X, and have gone to pick up the items in the same time window. In this case, from the view of the authentication system S, the user A and the user B cannot be distinguished from each other, and there is a fear that the user A may be erroneously authenticated as the user B. On the contrary, there is also a fear that the user B may be erroneously authenticated as the user A.

To address the above-mentioned problem, in a case in which, when the user A is to order items at the store X, another user B who resembles the user A in face has already placed an order at the store X, the button B40 of a time window in which the user B is to visit the store may be prevented from being displayed on the confirmation screen G4 of the user A. In other words, the buttons B40 of other time windows may be displayed on the confirmation screen G4 of the user A so as to avoid the time window in which the user B is to visit the store X.

Before registering a user ID and scheduled time information of a user A in the order database DB3, the registration unit 103 registers a user ID on another user B who is to visit the store, and scheduled time information on scheduled time at which the other user B is to visit the store, in association with each other in the order database DB3. A flow in which the user B places the order and the user ID is registered is as described in the embodiment.

The authentication system S according to Modification Example (1) of the present disclosure includes the determination unit 106. The determination unit 106 is configured to determine whether there is a fear of erroneous authentication between the user A and the other user B. The term "erroneous authentication" means that the user A is authenticated as the other user B, or that the other user B is authenticated as the user A. Stated differently, the term "erroneous authentication" means that the user A and the other user B cannot be distinguished from each other in the authentication.

For example, when success or failure of the authentication is determined depending on similarity of the authentication information as in the biometric authentication, authentication information of the user A and authentication information of the user B matching or being similar corresponds to a fear of erroneous authentication. In the case of authentication information expressed in a vector form as with a feature amount of a face, a distance between a feature amount of a face of the user A and a feature amount of a face of the user B being less than a threshold value corresponds to a fear of erroneous authentication. Further, for example, when success or failure of the authentication is determined depending on matching of the authentication information as in PIN authentication, the authentication information of the user A and the authentication information of the user B matching or being similar corresponds to a fear of erroneous authentication.

In this modification example, when the user A places an order at a store X, the determination unit 106 determines whether there is a fear of erroneous authentication based on the feature amount of the face of the user A and the feature amount of the face of the user B, which are registered in the user database DB2. It is assumed that the user B has already placed an order at the same store X as the user A, and has not picked up items. For that reason, a user who has already placed an order at the same store X as the user A and has picked up items is not a subject of the determination by the determination unit 106.

It is assumed that, for the items ordered by the user B, the user B who has ordered the items himself or herself goes to the store X to pick up the items. In other words, for both of the order of the user A and the order of the user B, the orderer and the receiver are the same. Even if the orderer and the receiver are different in at least one of the order of the user A and the order of the user B, the determination unit 106 may determine whether there is a fear of erroneous authentication based on the feature amount of the face of the receiver in the order of the user A and the feature amount of the face of the receiver in the order of the user B.

Further, in this modification example, description is given of a case in which the determination by the determination unit 106 is executed before the confirmation screen G4 of the user A is displayed, but the timing at which the determination by the determination unit 106 is executed may be any timing before the user ID and the scheduled time information that correspond to the order of the user A are registered in the order database DB3.

The presentation unit 101 presents the buttons B40 to the user based on a result of the determination by the determination unit 106. When it is determined that there is no fear of erroneous authentication between the user A and the other user B, the presentation unit 101 presents the buttons B40 as in the embodiment. When it is determined that there is a fear of erroneous authentication between the user A and the other user B, the presentation unit 101 presents buttons B40 of other time windows so as to avoid the time window indicated by the scheduled time information of the other user B. In this case, a method of determining the other time windows is different only in that the time indicated by the scheduled time information of the other user B is excluded, and a basic determination method is similar to that in the embodiment.

According to Modification Example (1), with the buttons B40 being presented to the user A based on the result of determination as to whether there is a fear of erroneous authentication between the user A and the other user B, occurrence of erroneous authentication can be prevented reliably.

(2) Further, for example, when an item that takes considerable time for cooking is in the shopping cart, there is a fear that a button B40 of a time window in which the user can go for pickup is not displayed on the confirmation screen G4. In this case, when the user deletes the item from the shopping cart, pickup in an earlier time window in which the user can go for pickup may become available. On the contrary, even when the user does not delete the item from the shopping cart, pickup in a later time window in which the user can go for pickup may become available.

Accordingly, through displaying of, on the confirmation screen G4, in addition to the buttons B40 described in the embodiment, at least one of a button B40 of an earlier time window that becomes available when the content of the shopping cart is changed, and a button B40 of a time window that is later than the time windows indicated by the buttons B40 described in the embodiment, more flexible pickup is allowed, to thereby increase convenience of the user.

Figure 15:
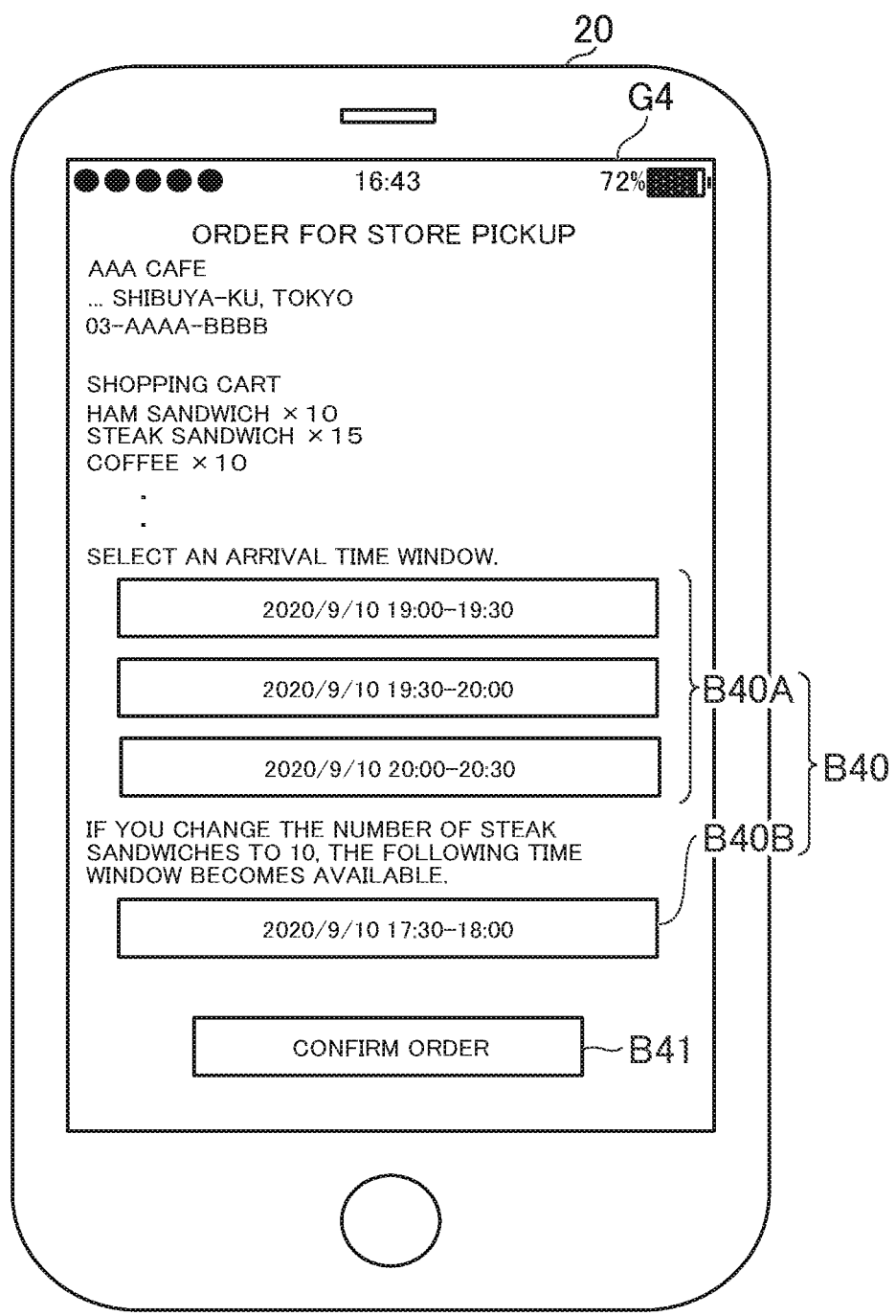
FIG. 15 is a view for illustrating an example of a confirmation screen in Modification Example (2) of the present disclosure.

FIG. 15 is a view for illustrating an example of the confirmation screen G4 in Modification Example (2) of the present disclosure. As illustrated in FIG. 15, the presentation unit 101 in this modification example presents, to the user, a plurality of buttons B40 including buttons B40A based on the conditions specified by the user, and a button B40B based on a condition obtained by changing a part of the conditions.

The term "conditions" means conditions for determining a possible arrival time or time window. In this modification example, at least one of the number of items, types of the items, and the means of travel corresponds to the conditions. The phrase "condition obtained by changing a part of the conditions" means a condition obtained by changing at least one of those conditions. The change of the conditions may be executed on the authentication system S side, or by operation of the user.

In the case of the example of FIG. 15, the presentation unit 101 reduces the number of units of an item, which is a condition specified by the user, from 15 to 10 to present the button B40B indicating an earlier time window. The presentation unit 101 may reduce the numbers of units of a plurality of items to present a button B40 indicating an even earlier time window. The presentation unit 101 may delete at least one item instead of reducing the number of units of an item to present the button B40B indicating an early time window.

The presentation unit 101 may present the button B40B by changing the current means of travel and calculating the time at which the user can visit the store. For example, the presentation unit 101 may present the button B40B indicating an earlier time window by changing to means of travel that is higher in travel speed than the means of travel that is currently selected. Further, for example, the presentation unit 101 may allow the user to select whether to change the items in the shopping cart, or to change the means of travel.

Further, for example, the presentation unit 101 may change both of the items in the shopping cart and the means of travel to present the button B40B indicating an earlier time window. Still further, for example, the presentation unit 101 may allow the user to select whether the user desires a time window that is later than the time windows indicated by the buttons B40A, and when the user desires the time window, the presentation unit 101 may present a button B40B indicating a later time window.

According to Modification Example (2), by presenting, to the user, the plurality of buttons B40 including the buttons B40A based on the conditions specified by the user, and the button B40B based on the condition obtained by changing a part of the conditions, in a case in which there is no desired time or time window, when the user makes some compromise to change the conditions, the user can visit the store at or in the desired time or time window, and hence convenience of the user can be increased.

(3) Further, for example, in a case in which a user A and another user B who resembles the user A in face order items at the same store X, and go to pick up the items in the same time window, additional authentication, for example, PIN authentication, may be required of at least one of the user A and the other user B.

The authentication system S according to Modification Example (3) of the present disclosure includes a registration unit 103 and a determination unit 106. Details of each of the registration unit 103 and the determination unit 106 are as described in Modification Example (1).

The authentication system S according to Modification Example (3) includes an additional authentication unit 107. The additional authentication unit 107 is configured to require the additional authentication of the person who has visited the store based on a result of determination by the determination unit 106. When it is determined that there is no fear of erroneous authentication between the user A and the other user B, the additional authentication unit 107 does not require the additional authentication. When it is determined that there is a fear of erroneous authentication between the user A and the other user B, the presentation unit 101 requires the additional authentication.

The additional authentication is authentication different from the authentication by the authentication unit 104. The "additional authentication" means authentication executed separately from the authentication by the authentication unit 104, and is not necessarily executed after the authentication by the authentication unit 104. The additional authentication may be executed before the authentication by the authentication unit 104. The additional authentication may be authentication of two or more steps combining a plurality of authentication methods.

Various authentication methods are applicable to an authentication method of the additional authentication itself. For example, when the authentication by the authentication unit 104 is face authentication, the additional authentication may be biometric authentication (for example, fingerprint authentication) other than the face authentication. Alternatively, for example, when the authentication by the authentication unit 104 is the biometric authentication, the additional authentication may be authentication (for example, PIN authentication) other than the biometric authentication.

It is assumed that authentication information required for the additional authentication is registered in advance in the user database DB2. For example, when the finger print authentication is used as the additional authentication, a correct fingerprint pattern is registered in advance in the user database DB2. Alternatively, for example, when the PIN authentication is used as the additional authentication, a correct PIN is registered in advance in the user database DB2. When another authentication method is used as the additional authentication, authentication information corresponding to the another authentication method is registered in advance in the user database DB2.

The additional authentication unit 107 acquires authentication information of the person who has visited the store with the use of the store terminal 30. For example, when the finger print authentication is used as the additional authentication, the additional authentication unit 107 acquires a fingerprint pattern of the person who has visited the store with the use of the photographing unit 36 or a fingerprint sensor. Alternatively, for example, when the PIN authentication is used as the additional authentication, the additional authentication unit 107 acquires a PIN input by the person who has visited the store with the use of the operation unit 34. When the another authentication method is used as the additional authentication, the authentication information corresponding to the another authentication method is acquired with the use of the store terminal 30.

The additional authentication unit 107 executes the additional authentication based on the authentication information of the person who has visited the store, and the authentication information for the additional authentication, which is registered in the user database DB2. Determination in a known authentication method is applicable to the determination as to success or failure of the additional authentication itself. For example, when the finger print authentication is used as the additional authentication, success or failure of the additional authentication is determined based on similarity between the fingerprint pattern of the person who has visited the store, and the fingerprint pattern registered in the user database DB2. Alternatively, for example, when the PIN authentication is used as the additional authentication, success or failure of the additional authentication is determined based on matching between the PIN input by the person who has visited the store, and the PIN registered in the user database DB2.

The permission unit 105 permits pickup of the items at the store when the authentication by the authentication unit 104 is successful, and the additional authentication by the additional authentication unit 107 is successful. The permission unit 105 does not permit pickup of the items at the store when the authentication by the authentication unit 104 has failed, or the additional authentication by the additional authentication unit 107 has failed. In other words, in order for the pickup of the items to be permitted, the following three conditions are required to be satisfied: success of the authentication, success of the additional authentication, and matching between the visit time information and the scheduled time information.

According to Modification Example (3), by requiring the additional authentication of the person who has visited the store based on the result of the determination as to whether there is a fear of erroneous authentication between the user and another user, occurrence of the erroneous authentication can be prevented reliably.

(4) Further, for example, the modification examples described above may be combined.

Still further, for example, a receiver may be a person who is yet to perform user registration. For example, also in a case in which items ordered by a user who has performed user registration are to be picked up by a family member who is yet to perform user registration, the authentication system S may execute authentication of the family member. In this case, the user registers a portrait and other information of the family member in the order database DB3 at the time of ordering. The server 10 may execute the authentication based on a feature amount of a face of the family member, which is extracted from the portrait registered in the order database DB3, and a feature amount of a face of the family member obtained as a result of photographing by the photographing unit 46 of the pickup box 40.

Yet further, for example, the pickup box 40 may have a configuration that is simpler than the configuration described in this embodiment. For example, the pickup box 40 may have a simple configuration not including the control unit 41, the storage unit 42, the operation unit 44, and the display unit 45. Alternatively, for example, the pickup box 40 may include only the photographing unit 46 connected to the store terminal 30, and transmit a taken image to the store terminal 30. Alternatively, for example, the pickup box 40 may be connected to the store terminal 30 without including even the photographing unit 46. In this case, the pickup box 40 may unlock and open/close the door as instructed by the store terminal 30. With the pickup box 40 having a simple configuration, complicated setting operation can be eliminated when the pickup box 40 is installed in the store.

Yet further, for example, the pickup box 40 has been described as the device configured to acquire the visitor information, but a device in or near the store may be used to acquire the visitor information. For example, the store terminal 30 may be used to acquire the visitor information. Alternatively, for example, the visitor information may be acquired by the user bringing the user terminal 20 to the store to take an image of his or her face with the user terminal 20 and transmit the image to the server 10. In this case, the visit to the store may be detected based on positional information using the GPS receiver of the user terminal 20, for example.

Yet further, for example, description has been given of the case in which an eating and drinking establishment corresponds to the store, but as to the store, a supermarket, a convenience store, a drugstore, a book store, a consumer electronics mass retailer, or a general store may correspond to the store. Further, for example, food and drink, commodities, clothing, books, consumer electronics, general merchandise, or the like may correspond to the items sold at those stores. The authentication system S is applicable to a situation in which the user visits one of those certain stores to pick up those certain items.

Yet further, for example, description has been given of the case in which the authentication system S is applied to the service of accepting an order, but the authentication system S may be applied to other services. For example, the authentication system S may be applied to authentication at the time of admission to a concert, sport, or other events. In this case, a scheduled time or time window at or in which the user is admitted is determined in advance. When someone visits the venue, the authentication system S may execute authentication as in the embodiment to admit the user. In addition, for example, the authentication system S may be applied to authentication for admission to an art museum and other facilities, authentication for priority admission (what is called "fastpass") to an amusement park and other recreational facilities, and authentication for check-in to accommodation facilities.

Yet further, for example, description has been given of the case in which main functions are achieved in the server 10, but the functions may be shared by a plurality of computers. For example, the functions may be shared among the server 10, the user terminal 20, the store terminal 30, and the pickup box 40. For example, the authentication processing may be executed in the user terminal 20, the store terminal 30, or the pickup box 40 instead of the server 10. Further, for example, when the authentication system S includes a plurality of server computers, the functions may be shared among the plurality of server computers. Still further, for example, the data described to be stored in the data storage unit 100 may be stored by a computer other than the server 10.

The invention claimed is:

1. An authentication system, comprising at least one processor in communication with a memory, configured to:
register user information on a user who is to visit a predetermined location, and register scheduled time information on scheduled time at which the user is to visit the predetermined location, in association with each other in a storage;
execute, when someone visits the predetermined location, authentication based on visitor information on the someone, the user information, visit time information on time at which the someone visits the predetermined location, and the scheduled time information;
wherein the at least one processor is configured to:
present, to the user or a requester who requests the user to travel, options on time at which the user is to visit the predetermined location,
acquire the scheduled time information based on one of the options that is selected by the user or the requester, and
register the scheduled time information in the storage;
wherein the at least one processor is configured to present the options to the user or the requester based on preparation time information on time required for preparation in the predetermined location.

2. The authentication system according to claim 1, wherein the at least one processor is configured to register the user information on each of a plurality of users who are to visit the predetermined location, and the scheduled time information on scheduled times at which the plurality of users are to visit the predetermined location, in association with each other in the storage, and
wherein the at least one processor is configured to execute the authentication based on the visitor information and, of the user information on each of the plurality of users, the user information with which the scheduled time information corresponding to the visit time information is associated.

3. The authentication system according to claim 1, wherein the at least one processor is configured to register, in association with each of a plurality of the predetermined locations, the user information on a user who is to visit the predetermined location, and the scheduled time information on scheduled time at which the user is to visit the predetermined location, in the storage, and
wherein the at least one processor is configured to execute, when the someone visits any one of the plurality of predetermined locations, the authentication based on the visitor information on the someone, the user information associated with the predetermined location, the visit time information on time at which the someone visits the predetermined location, and the scheduled time information associated with the predetermined location.

4. The authentication system according to claim 1, wherein the at least one processor is configured to present the options to the user or the requester based on capacity information on a capacity in the predetermined location.

5. The authentication system according to claim 1, wherein the at least one processor is configured to present, to the user or the requester, a plurality of the options including the options based on conditions specified by the user or the requester, and the options based on conditions obtained by changing a part of the conditions.

6. The authentication system according to claim 1, wherein the at least one processor is configured to register biometric information of the user, or identification information of the user for acquiring the biometric information, as the user information in the storage,
wherein the visitor information is biometric information of the someone, and
wherein the at least one processor is configured to execute the authentication based on the biometric information of the someone, the biometric information of the user, the visit time information, and the scheduled time information.

7. The authentication system according to claim 1,
wherein the predetermined location is a store at which the user is to pick up an item,
wherein the scheduled time information is information on scheduled time at which the user is to visit the store,
wherein the visit time information is information on time at which the someone visits the store, and
wherein the at least one processor is configured to permit the pickup of the item at the store when the authentication is successful.

8. An authentication system, comprising at least one processor in communication with a memory, configured to:
register user information on a user who is to visit a predetermined location, and register scheduled time information on scheduled time at which the user is to visit the predetermined location, in association with each other in a storage;
execute, when someone visits the predetermined location, authentication based on visitor information on the someone, the user information, visit time information on time at which the someone visits the predetermined location, and the scheduled time information;
wherein the at least one processor is configured to:
present, to the user or a requester who requests the user to travel, options on time at which the user is to visit the predetermined location,
acquire the scheduled time information based on one of the options that is selected by the user or the requester,
register the scheduled time information in the storage; and
wherein the at least one processor is configured to present the options to the user or the requester based on travel time information on time required to travel to the predetermined location.

9. The authentication system according to claim 8, wherein the at least one processor is configured to acquire the travel time information based on, of a plurality of means of travel, means of travel specified by the user or the requester.

10. An authentication system, comprising at least one processor in communication with a memory, configured to:
register user information on a user who is to visit a predetermined location, and register scheduled time information on scheduled time at which the user is to visit the predetermined location, in association with each other in a storage;
execute, when someone visits the predetermined location, authentication based on visitor information on the someone, the user information, visit time information on time at which the someone visits the predetermined location, and the scheduled time information;
wherein the at least one processor is configured to:
present, to the user or a requester who requests the user to travel, options on time at which the user is to visit the predetermined location,
acquire the scheduled time information based on one of the options that is selected by the user or the requester,
register the scheduled time information in the storage; and
wherein the at least one processor is configured to register, before registering the user information of the user and the scheduled time information in the storage, user information on another user who is to visit the predetermined location, and scheduled time information on scheduled time at which the another user is to visit the predetermined location, in association with each other in the storage,
wherein the at least one processor is configured to determine whether a fear of erroneous authentication exists between the user and the another user, and
wherein the at least one processor is configured to present the options to the user or the requester based on a result of the determination.

11. An authentication system, comprising at least one processor in communication with a memory, configured to:
register user information on a user who is to visit a predetermined location, and register scheduled time information on scheduled time at which the user is to visit the predetermined location, in association with each other in a storage; and
execute, when someone visits the predetermined location, authentication based on visitor information on the someone, the user information, visit time information on time at which the someone visits the predetermined location, and the scheduled time information;
wherein the at least one processor is configured to register, before registering the user information of the user and the scheduled time information in the storage, user information on another user who is to visit the predetermined location, and scheduled time information on scheduled time at which the another user is to visit the predetermined location, in association with each other in the storage, and
wherein the at least one processor is configured to:
determine whether a fear of erroneous authentication exists between the user and the another user; and
request additional authentication of the someone based on a result of the determination.

* * * * *